United States Patent
Liu et al.

(10) Patent No.: US 9,946,413 B2
(45) Date of Patent: Apr. 17, 2018

(54) TOUCH MODULE AND MANUFACTURING METHOD THEREOF

(71) Applicant: TPK Touch Solutions Inc., Taipei (TW)

(72) Inventors: Chen-Yu Liu, Taoyuan (TW); Lu-Hsing Lee, Taoyuan (TW); Che-Chieh Chang, Taoyuan (TW); Huai-San Ku, Taipei (TW)

(73) Assignee: TPK Touch Solutions Inc., Taipei (TW)

(*) Notice: Subject to any disclaimer, the term of this patent is extended or adjusted under 35 U.S.C. 154(b) by 409 days.

(21) Appl. No.: 14/637,379

(22) Filed: Mar. 3, 2015

(65) Prior Publication Data
US 2015/0309615 A1    Oct. 29, 2015

(30) Foreign Application Priority Data

Mar. 5, 2014 (CN) .......................... 2014 1 0078743

(51) Int. Cl.
*G06F 3/045* (2006.01)
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC . G06F 2203/04111; G06F 2203/04103; G06F 3/044
See application file for complete search history.

(56) References Cited

U.S. PATENT DOCUMENTS

| | | | | |
|---|---|---|---|---|
| 2009/0085885 A1* | 4/2009 | Wu | .......................... | G06F 3/041 345/173 |
| 2010/0238133 A1* | 9/2010 | Wu | .......................... | G06F 3/044 345/174 |
| 2012/0132930 A1* | 5/2012 | Young | ................. | H01L 31/0481 257/84 |
| 2013/0000952 A1* | 1/2013 | Srinivas | ................... | H01B 1/02 174/126.1 |
| 2014/0333848 A1* | 11/2014 | Chen | ....................... | G06F 3/044 349/12 |

FOREIGN PATENT DOCUMENTS

KR    20130111785 A    * 10/2013

* cited by examiner

*Primary Examiner* — Kent Chang
*Assistant Examiner* — Mark Edwards
(74) *Attorney, Agent, or Firm* — Paul David Bendemire

(57) ABSTRACT

A touch module and a manufacturing method thereof are disclosed. The touch module includes a substrate, at least two first touch electrodes, at least two second touch electrodes, at least one electrode channel, and at least one bridge. All of the first touch electrodes, the second touch electrodes, and the electrode channel are embedded in the substrate. The electrode channel is configured to connect the second touch electrodes to each other. The bridge crosses over the electrode channel, is configured to electrically connect the first touch electrodes to each other. The first touch electrodes and the second touch electrodes are insulated from each other.

32 Claims, 38 Drawing Sheets

TOUCH MODULE AND MANUFACTURING METHOD THEREOF

This application claims priority to Chinese Patent Application Serial Number 201410078743.0, filed Mar. 5, 2014, the entirety of which is herein incorporated by reference.

BACKGROUND OF THE INVENTION

Field of Invention

The present disclosure relates to an electronic device and a manufacturing method. More particularly, the present disclosure relates to a touch module and a manufacturing method thereof.

Description of Related Art

With advances in electronic technology, touch modules are widely used in various kinds of electronic devices, such as mobile phones and tablet computers.

A typical touch module can be, for example, disposed on a display screen, and include a plurality of touch electrodes. When an object (e.g., a finger or a stylus pen) approaches or touches the display screen, a corresponding touch electrode generates an electronic signal and transmits the electronic signal to a control circuit, such that touch sensing can be realized.

In a manufacturing process of the touch module, conductive material disposed between the touch electrodes is typically removed by an etching process, so as to pattern the touch electrodes and isolate the touch electrodes from each other.

SUMMARY OF THE INVENTION

Thus, in order to avoid uneven refractive indexes of a touch module, one aspect of the present disclosure is related to a touch module. In accordance with one or more embodiments of the present disclosure, the touch module includes a substrate, at least two first touch electrodes, at least two second touch electrodes, at least one electrode channel, and at least one bridge. All of the first touch electrodes, the second touch electrodes, and the electrode channel are embedded in the substrate. The electrode channel is configured to electrically connect the second touch electrodes to each other. The bridge is configured to electrically connect the first touch electrodes to each other. The first touch electrodes are electrically insulated from the second touch electrodes.

In accordance with one or more embodiments of the present disclosure, the substrate further includes a base layer and an active layer, the active layer is disposed on the base layer, and the first touch electrodes, the second touch electrodes, and the electrode channel are embedded in the active layer.

In accordance with one or more embodiments of the present disclosure, heights of the first touch electrode relative to a first surface of the substrate and heights of the second touch electrode relative to the first surface of the first substrate are different.

In accordance with one or more embodiments of the present disclosure, a difference between the heights of the first touch electrodes relative to the first surface of the substrate and the heights of the second touch electrodes relative to the first surface of substrate is greater than 50 nanometers.

In accordance with one or more embodiments of the present disclosure, heights of the first touch electrodes relative to a first surface of the substrate are the same as heights of the second touch electrodes relative to the first surface of the substrate.

In accordance with one or more embodiments of the present disclosure, the touch module further includes a conductive residual material. An orthogonal projection of the conductive residual material onto a first surface of the substrate is located among orthogonal projections of the first touch electrodes, the second touch electrodes, and the electrode channel onto the first surface of the substrate. A height of the conductive residual material relative to the first surface of the substrate is sufficiently different from heights of the first touch electrodes, the second touch electrodes, and the electrode channel relative to the first surface of the substrate, such that the conductive residual material is insulated from the first touch electrodes, the second touch electrodes, and the electrode channel.

In accordance with one or more embodiments of the present disclosure, orthogonal projections of the conductive residual material, the first touch electrodes, the second touch electrodes, and the electrode channel onto the first surface of substrate are substantially not overlapped with each other.

In accordance with one or more embodiments of the present disclosure, the touch module further includes an insulator layer. The insulator layer is disposed between the conductive residual material and the bridge, and is configured to isolate the conductive residual material and the bridge.

In accordance with one or more embodiments of the present disclosure, a difference between the height of the conductive residual material relative to the first surface of the substrate and the heights of the first touch electrodes relative to the first surface of the substrate is greater than 50 nanometers, or a difference between the height of the conductive residual material relative to the first surface of the substrate and the heights of the second touch electrodes relative to the first surface of the substrate is greater than 50 nanometers.

In accordance with one or more embodiments of the present disclosure, a height of the electrode channel relative to a first surface of the substrate is the same as heights of the second touch electrodes relative to the first surface of the substrate.

In accordance with one or more embodiments of the present disclosure, the substrate includes at least two contact holes disposed on the first touch electrodes, in which the bridge is electrically contacted to the first touch electrodes via the contact holes.

In accordance with one or more embodiments of the present disclosure, embedding depths of the first touch electrodes or the second touch electrodes relative to a second surface of the substrate are substantially between 10 and 500 nanometers, and the second surface opposite to the first surface.

In accordance with one or more embodiments of the present disclosure, the first touch electrodes are disposed along a first direction, the second touch electrodes are disposed along a second direction, and the first direction is different from the second direction.

In accordance with one or more embodiments of the present disclosure, each of the first touch electrodes and the second touch electrodes substantially has a diamond shape.

Some other embodiments of the present disclosure are related to a manufacturing method of the touch module. In accordance with one or more embodiments of the present disclosure, the manufacturing method includes providing a substrate; embedding at least two first touch electrodes, at least two second touch electrodes, and at least one electrode channel into the substrate, in which the electrode channel is configured to electrically connect the second touch electrodes to each other; and providing at least one bridge on the first surface of the substrate, so as to electrically connect the first touch electrodes to each other. The first touch electrodes are electrically insulated from the second touch electrodes.

In accordance with one or more embodiments of the present disclosure, the step of providing the substrate includes providing a base layer, and providing an active layer on the base layer. The step of embedding the at least two first touch electrodes, the at least two second touch electrodes, and the at least one electrode channel into the substrate includes embedding the at least two first touch electrodes, the at least two second touch electrodes, and the at least one electrode channel into the active layer of the substrate.

In accordance with one or more embodiments of the present disclosure, the step of embedding the at least two first touch electrodes, the at least two second touch electrodes, and the at least one electrode channel into the substrate includes: providing a fundamental conductive material layer on the substrate; and embedding a fundamental embedding portion of the fundamental conductive material layer into the substrate to a first height relative to a first surface of the substrate, so as to form the first touch electrodes, the second touch electrodes, and the electrode channel, and retaining a fundamental retention portion of the fundamental conductive material layer on a second surface of the substrate, so as to form a conductive residual material.

In accordance with one or more embodiments of the present disclosure, the manufacturing method further includes providing an insulator layer on the conductive residual material before the bridge is provided, so as to isolate the bridge and the conductive residual material.

In accordance with one or more embodiments of the present disclosure, the step of embedding the fundamental embedding portion of the fundamental conductive material layer into the substrate includes providing an embedding ink without conductive additive on the substrate corresponding to the fundamental embedding portion of the fundamental conductive material layer, such that the fundamental embedding portion of the fundamental conductive material layer is embedded into the substrate.

In accordance with one or more embodiments of the present disclosure, the step of embedding the at least two first touch electrodes, the at least two second touch electrodes, and the at least one electrode channel into the substrate includes providing a fundamental conductive material layer on the substrate; embedding a fundamental embedding portion of the fundamental conductive material layer into the substrate to a first height relative to a first surface of the substrate, so as to form a first conductive material layer, and retaining a fundamental retention portion of the fundamental conductive material layer on a second surface of the substrate, so as to form a conductive residual material; and further embedding a first embedding portion of the first conductive material layer into the substrate to a second height relative to the first surface of the substrate, so as to form a second conductive material layer, and retaining a first retention portion of the first conductive material layer at the first height relative to the first surface of the substrate. The first retention portion includes the first touch electrodes, and the second retention portion includes an assembly of the second touch electrodes and the electrode channel; or the first retention portion includes the assembly of the second touch electrodes and the electrode channel, and the second retention portion includes the first touch electrodes.

In accordance with one or more embodiments of the present disclosure, the manufacturing method further includes providing an insulator layer on the conductive residual material before the bridge is provided, so as to isolate the bridge and the conductive residual material.

In accordance with one or more embodiments of the present disclosure, the step of embedding the fundamental embedding portion of the fundamental conductive material layer into the substrate includes providing an embedding ink without conductive additive on the fundamental embedding portion of the fundamental conductive material layer, such that the fundamental embedding portion of the fundamental conductive material layer is embedded into the substrate.

In accordance with one or more embodiments of the present disclosure, the step of embedding the at least two first touch electrodes, the at least two second touch electrodes, and the at least one electrode channel into the substrate includes embedding a first conductive material layer into the substrate to a first height relative to a first surface of the substrate; further embedding a first embedding portion of the first conductive material layer into the substrate to a second height relative to the first surface of the substrate, so as to form a second conductive material layer, and retaining a first retention portion of the first conductive material layer at the first height relative to the first surface of the substrate; and further embedding a second embedding portion of the second conductive material layer into the substrate to a third height relative to the first surface of the substrate, so as to form a third conductive material layer, and retaining a second retention portion of the second conductive material layer at the second height relative to the first surface of the substrate. The first retention portion includes one of the first touch electrodes, an assembly of the second touch electrodes and the electrode channel, and a conductive residual material; the second retention portion includes another one of the first touch electrodes, the assembly of the second touch electrodes and the electrode channel, and the conductive residual material; and the third retention portion includes the last one of the first touch electrodes, the assembly of the second touch electrodes and the electrode channel, and the conductive residual material.

In accordance with one or more embodiments of the present disclosure, the step of embedding the first conductive material layer into the substrate includes providing an embedding ink having conductive additive on the substrate to cause the conductive additive to be embedded into the substrate to form the first conductive material layer.

In accordance with one or more embodiments of the present disclosure, the step of embedding the first conductive material layer into the substrate includes providing a fundamental conductive material layer on the substrate; and providing an embedding ink without conductive additive on the fundamental conductive material layer to cause the fundamental conductive material layer be embedded into the substrate, to form the first conductive material layer.

In accordance with one or more embodiments of the present disclosure, the step of further embedding the first embedding portion of the first conductive material layer into the substrate includes providing an embedding ink without conductive additive on the substrate corresponding to the first embedding portion of the first conductive material layer, such that the first embedding portion of the first conductive material layer is embedded into the substrate.

In accordance with one or more embodiments of the present disclosure, the manufacturing method further includes forming at least two contact holes in the substrate before the bridge is provided, so as to allow the bridge to be electrically contacted to the first touch electrodes via the contact holes.

In accordance with one or more embodiments of the present disclosure, the step of forming the contact holes in the substrate includes providing a mask on the substrate and exposing at least two opening portions of the substrate, and removing the at least two opening portions of the substrate to form the contact holes.

In accordance with one or more embodiments of the present disclosure, the manufacturing method further includes providing an insulator layer covering the substrate and a conductive residual material and exposing at least two opening portions of the substrate before the bridge is provided, in which the insulator layer is used to isolate the bridge and the conductive residual material. The step of forming the contact holes in the substrate includes etching off the at least two opening portions of the substrate to form the contact holes.

In view of the above, through application of one or more embodiments described above, a touch module can be realized. By embedding touch electrodes into the substrate, the touch electrodes can be patterned and isolated from each other. As a result, patterning the touch electrodes by an etching process can be avoided, such that the problem of adversely affecting the optical consistency in the appearance of the touch module caused by uneven refractive indexes of the touch module is not encountered.

BRIEF DESCRIPTION OF THE DRAWINGS

FIGS. 1A-6A illustrate a manufacturing method of a touch module according to one or more embodiments of the present disclosure.

FIG. 1B-6B are sectional views of the touch module along lines A-A in FIGS. 1A-6A according to one or more embodiments of the present disclosure.

FIGS. 9A-14A illustrate a manufacturing method of a touch module according to one or more embodiments of the present disclosure.

FIGS. 9B-14B are sectional views of the touch module along lines A-A in FIGS. 9A-14A according to one or more embodiments of the present disclosure.

FIGS. 15A-21A illustrate a manufacturing method of a touch module according to one or more embodiments of the present disclosure.

FIGS. 15B-21B are sectional views of the touch module along lines A-A in FIGS. 15A-21A according to one or more embodiments of the present disclosure.

FIGS. 22A-23A illustrate a manufacturing method of a touch module according to one or more embodiments of the present disclosure.

FIGS. 22B-23B are sectional views of the touch module along lines A-A in FIGS. 22A-23A according to one or more embodiments of the present disclosure.

FIGS. 24A-26A illustrate a manufacturing method of a touch module according to one or more embodiments of the present disclosure.

FIGS. 24B-26B are sectional views of the touch module along lines A-A in FIGS. 24A-26A according to one or more embodiments of the present disclosure.

FIGS. 27A-32A illustrate a manufacturing method of a touch module according to one or more embodiments of the present disclosure.

FIGS. 27B-32B are sectional views of the touch module along lines A-A in FIGS. 27A-32A according to one or more embodiments of the present disclosure.

FIGS. 33A-34A illustrate a manufacturing method of a touch module according to one or more embodiments of the present disclosure.

FIGS. 33B-34B are sectional views of the touch module along lines A-A in FIGS. 33A-34A according to one or more embodiments of the present disclosure.

FIGS. 35A-37A illustrate a manufacturing method of a touch module according to one or more embodiments of the present disclosure.

FIGS. 35B-37B are sectional views of the touch module along lines A-A in FIGS. 35A-37A according to one or more embodiments of the present disclosure.

DETAILED DESCRIPTION OF THE INVENTION

Figure 1A:
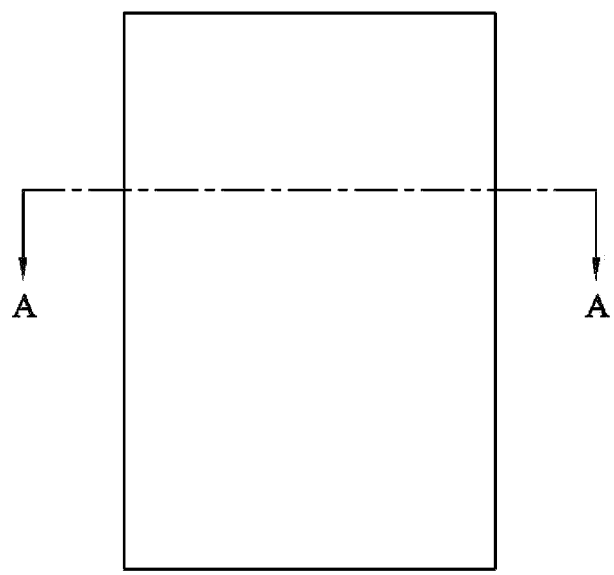

Reference will now be made in detail to the present embodiments of the present disclosure, examples of which are illustrated in the accompanying drawings. Wherever possible, the same reference numbers are used in the drawings and the description to refer to the same or like parts.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

One aspect of the present disclosure is related to a manufacturing method of a touch module. In the following paragraphs, first to sixth embodiments will be used as examples to describe details of the present disclosure. However, the disclosure is not limited to these embodiments. Other implementations are within the contemplated scope of the present disclosure.

First Method

FIGS. 1A-6A illustrate a manufacturing method of a touch module 100 according to one or more embodiments of the present disclosure. FIGS. 1B-6B are sectional views of the touch module 100 along lines A-A in FIGS. 1A-6A according to one or more embodiments of the present disclosure.

Figure 1B:
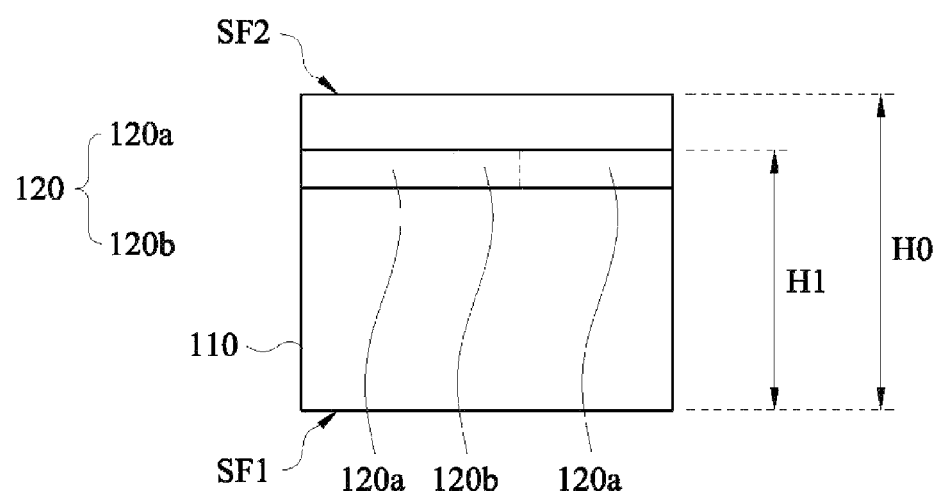

Reference is made to FIG. 1A and FIG. 1B. In a first step, a first conductive material layer 120 is embedded into a substrate 110 to a height H1 relative to a first surface SF1 of the substrate 110. The first conductive material layer 120 includes a first retention portion 120a and a first embedding portion 120b.

In some embodiments, an embedding ink having conductive additive is applied onto the substrate 110 to cause the conductive additive to be embedded into the substrate, so as to form the first conductive material layer 120. In one or more embodiments, the substrate 110 can be made by using polymethyl methacrylate (PMMA), polycarbonate (PC), polyethylene terephthalate (PET), cyclo olefin polymer (COP), or another suitable high polymer material, but is not limited in this regard. In one or more embodiments, the thickness of the substrate 110 (i.e., H0) is substantially between 50 and 550 micrometers. In one or more embodiments, the embedding ink having the conducting additive is made by dissolving the conducting additive into a specific liquid, in which the solubility parameter of the specific liquid is close to a solubility parameter of the material of the substrate 110, such that the conducting additive dissolved in the specific liquid can seep into the substrate 110 and be embedded into the substrate 110. In one or more embodiments, the conducting additive is made by using carbon nanotubes, nano metal traces, a conductive adhesive, conductive polymer, graphene, nano metal, or another suitable conductive material, but is not limited in this regard.

That is, by providing the embedding ink having the conducting additive on the second surface SF2 of the substrate 110, in which the substrate 110 is made by a high polymer material in one or more embodiments as described above, a portion of the substrate 110 adjacent to the second surface SF2 swells, such that the conducting additive dissolved in the specific liquid can permeate into the substrate 110 and be embedded into the substrate 110.

Figure 2A:
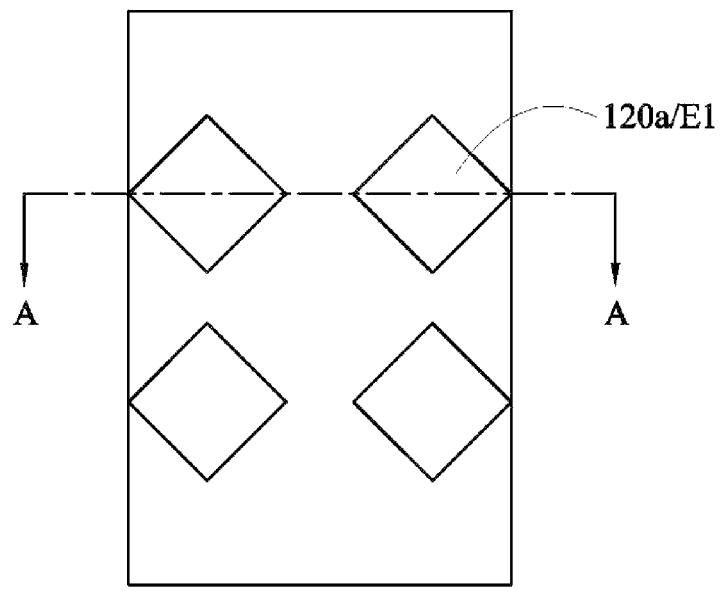
Figure 2B:
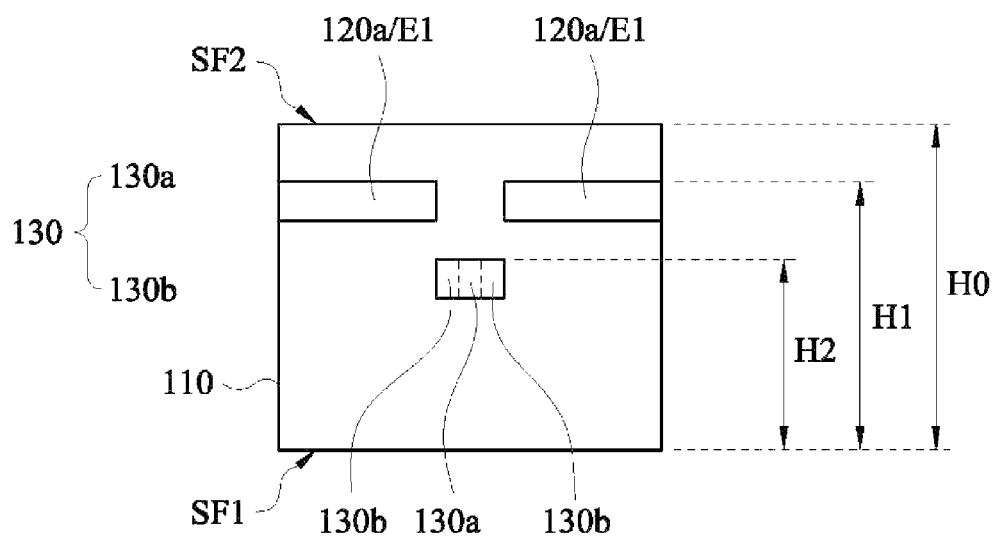

Particular reference is made to FIG. 2A and FIG. 2B. In a second step, the first embedding portion 120b of the first conductive material layer 120 (as illustrated in FIG. 2B) is further embedded into the substrate 110 to a height H2 relative to the first surface SF1 of the substrate 110, so as to form a second conductive material layer 130, and the first retention portion 120a of the first conductive material layer 120 is retained at the height H1 relative to the first surface SF1 of the substrate 110. The second conductive material layer 130 includes a second embedding portion 130b and a second retention portion 130a. The height H2 and the height H1 are different from each other. In one or more embodiments, a difference between the height H2 and the height H1 is greater than 50 nanometers, such that the first retention portion 120a with the height H1 and the second conductive material layer 130 with the height H2 are insulated from each other.

In some embodiments, the first embedding portion 120b of the first conductive material layer 120 is embedded into the substrate 110 to the height H2 relative to the first surface SF1 of the substrate 110 H2 by providing an embedding ink without conductive additive on the second surface SF2 of the substrate 110 corresponding to the first embedding portion 120b of the first conductive material layer 120. The embedding ink without conductive additive described herein may be made by the specific liquid with the specific solubility parameter described above.

It is noted that, in the present disclosure, the embedding ink with or without conductive additive can be provided on the substrate 110 by spraying or printing. However, the present disclosure is not limited in this regard.

Figure 3A:
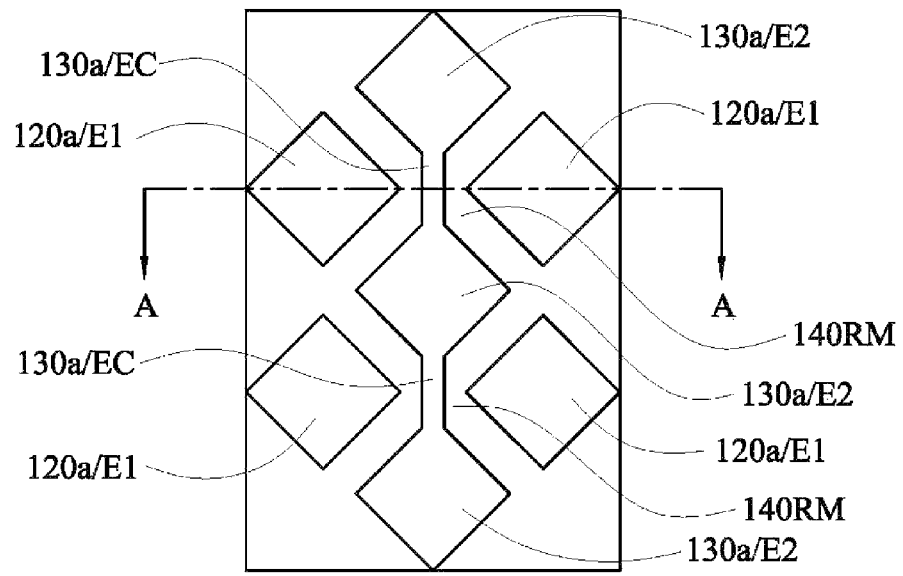
Figure 3B:
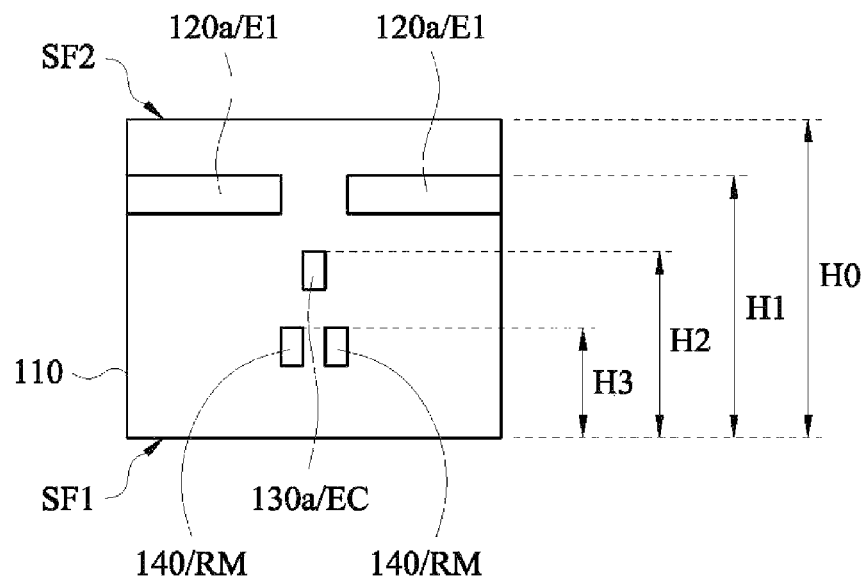

Particular reference is made to FIG. 3A and FIG. 3B. In a third step, the second embedding portion 130b of the second conductive material layer 130 is further embedded into the substrate 110 to a height H3 relative to the first surface SF1 of the substrate 110, so as to form a third conductive material layer 140, and the second retention portion 130a of the second conductive material layer 130 is retained at the height H2 relative to the first surface SF1 of the substrate 110. The height H3 and the height H2 are different from each other. In one or more embodiments, a difference between the height H3 and the height H2 is greater than 50 nanometers, such that the second retention portion 130a with the height H2 and the third conductive material layer 140 with the height H3 are insulated from each other.

Details of further embedding the second embedding portion 130b of the second conductive material layer 130 into the substrate 110 to the height H3 relative to the first surface SF1 of the substrate 110 can be ascertained by referring to the second step described above, and a description in this regard will not be repeated.

In some embodiments of the present disclosure, the first retention portion 120a includes one of the first touch electrodes E1, an assembly of the second touch electrodes E2 and the electrode channel EC, and a conductive residual material RM of the touch module 100. The second retention portion 130a includes another one of the first touch electrodes E1, the assembly of the second touch electrodes E2 and the electrode channel EC, and the conductive residual material RM of the touch module 100. The third conductive material layer 140 includes the last one of the first touch electrodes E1, the assembly of the second touch electrodes E2 and the electrode channel EC, and the conductive residual material RM of the touch module 100. For example, in some embodiments, the first retention portion 120a includes the first touch electrodes E1 of the touch module 100, the second retention portion 130a includes the assembly of the second touch electrodes E2 and the electrode channel EC of the touch module 100, and the third conductive material layer 140 includes the conductive residual material RM of the touch module 100.

The phrase "conductive residual material RM" used herein refers to a conductive material which is not used to fabricate the first touch electrodes E1, the second touch electrodes E2, and the electrode channel EC in this manufacturing process. In one or more embodiments, an orthogonal projection of the conductive residual material RM onto the first surface SF1 of the substrate 110 is located among orthogonal projections of the first touch electrodes E1, the second touch electrodes E2, and the electrode channel EC onto the first surface SF1 of the substrate 110. In some embodiments, a height of the conductive residual material RM relative to the first surface SF1 of the substrate 110 (e.g., the height H3) is sufficiently different from heights of the first touch electrodes E1, the second touch electrodes E2, and the electrode channel EC relative to the first surface SF1 of the substrate 110 (e.g., the heights H2, H3), such that the conductive residual material RM is insulated from the first touch electrodes E1, the second touch electrodes E2, and the electrode channel EC. By insulating the conductive residual material RM from the first touch electrodes E1, the second touch electrodes E2, and the electrode channel EC, the first touch electrodes E1, the second touch electrodes E2, and the electrode channel EC are insulated from each other.

Figure 4A:
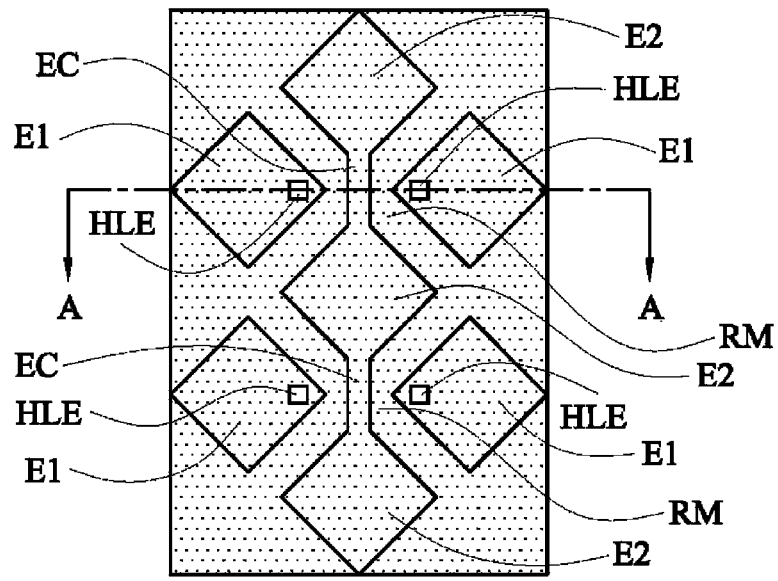
Figure 4B:
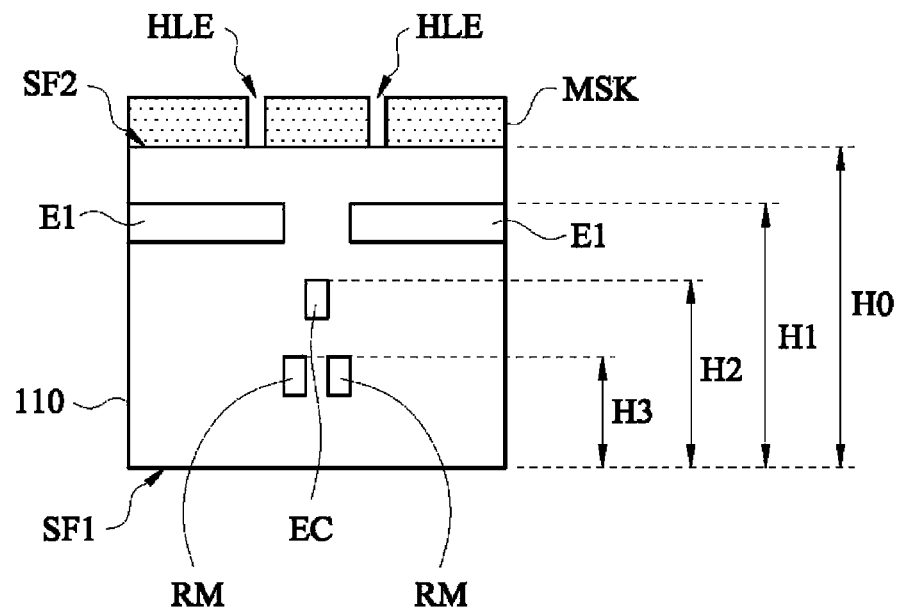

Particular reference is made to FIG. 4A and FIG. 4B. In a fourth step, a mask MSK is provided on the first surface SF1 or the second surface SF2 of the substrate 110 (in this example, the second surface SF2 is used), and at least two opening portions HLE of the substrate 110 are exposed.

Figure 5A:
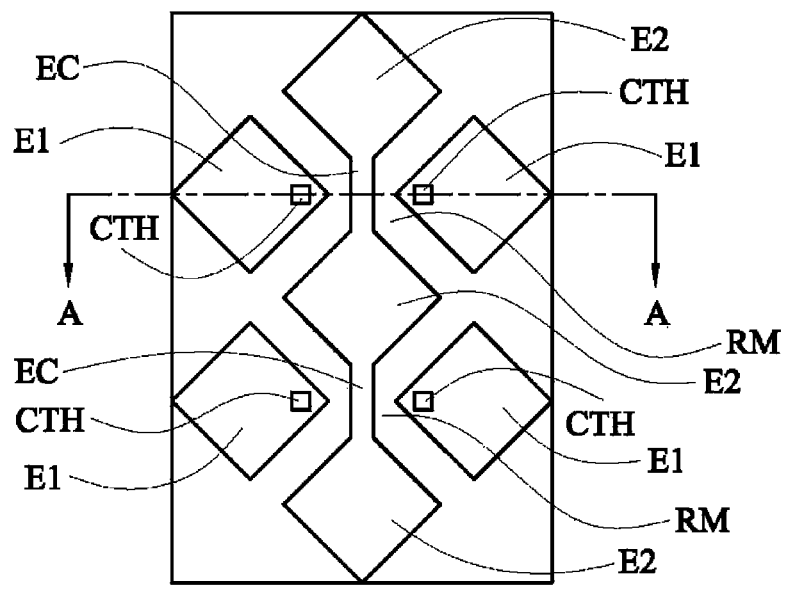
Figure 5B:
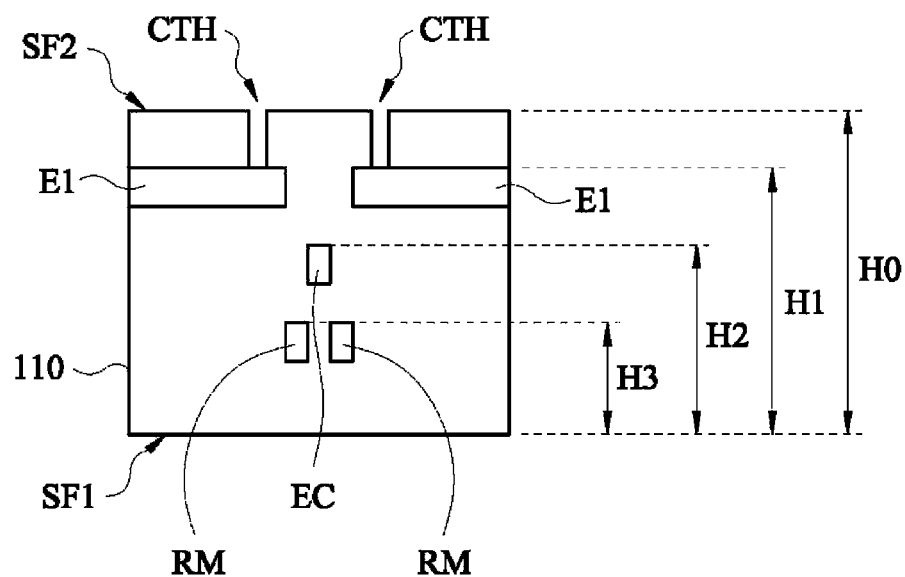

Particular reference is made to FIG. 5A and FIG. 5B. In a fifth step, the opening portions HLE of the substrate 110 are removed (e.g., by an etching process) to form at least two contact holes CTH. The contact holes CTH are separately disposed on the first touch electrodes E1, and are configured to expose portions of the first touch electrodes E1 embedded in the substrate 110. In this embodiment, the mask MSK on the substrate 110 can be simultaneously removed in the process of removing the opening portions HLE of the substrate 110.

Figure 6A:
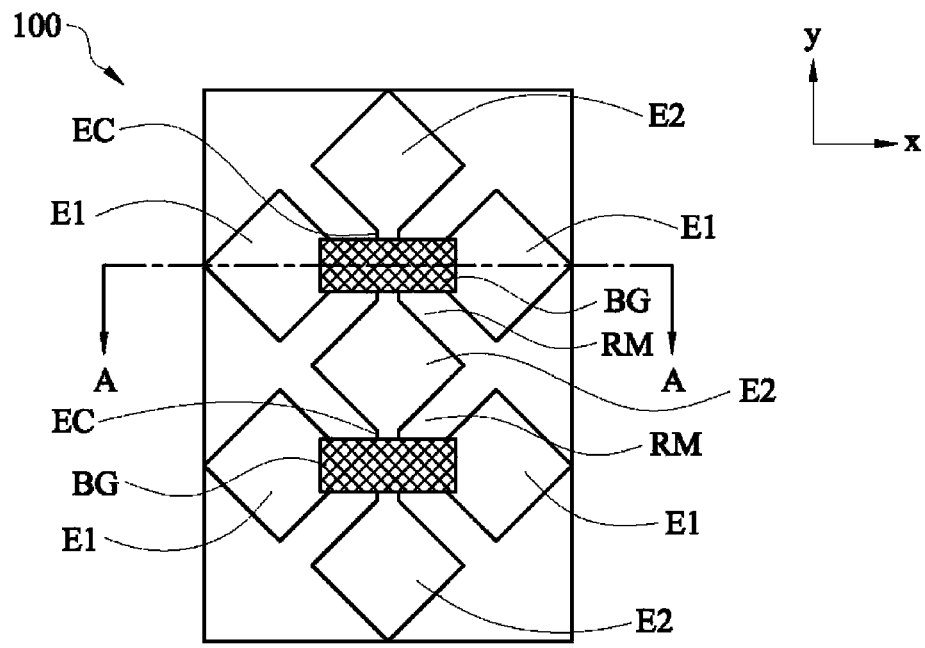
Figure 6B:
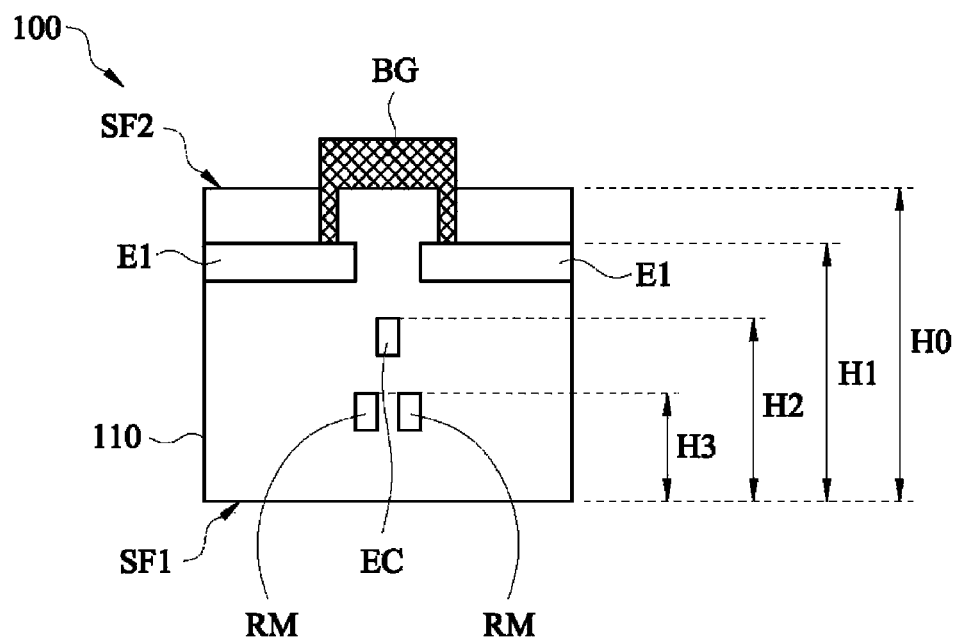

Particular reference is made to FIG. 6A and FIG. 6B. In a sixth step, a bridge BG is provided. The bridge BG crosses the electrode channel EC and is configured to electrically connect two adjacent first touch electrodes E1 to each other. In one or more embodiments, the bridge BG electrically connects two adjacent first touch electrodes E1 via the contact holes CHT.

Through the operations mentioned above, the touch module 100 can be realized. By patterning the first and second touch electrodes E1, E2 and the electrode channel EC with such an embedding process and instead of using an etching process, the problem of adversely affecting the optical consistency in the appearance of the touch module 100 caused by uneven refractive indexes of the touch module 100 can be avoided.

That is, by patterning the first and second touch electrodes E1, E2 and the electrode channel EC with such an embedding process, substantially no gap or overlap is present among the orthogonal projections of the first touch electrodes E1, the second touch electrodes E2, the electrode channel EC, and the conductive residual material RM onto the first surface SF1 of the substrate 110. As a result, the problem of adversely affecting the optical consistency in the appearance of the touch module 100 caused by uneven refractive indexes of the touch module 100 can be avoided.

It should be noted that, in the description herein and throughout the claims that follow, the term "substantially" is used in association with values that may vary slightly and in association with slight deviations that may result from manufacturing processes, in which such mirror errors do not change the properties relevant to the values and the characteristics of the elements. For example, manufacturing deviations of the first touch electrodes E1, the second touch electrodes E2, and the electrode channel EC of the touch module 100 may be caused by extrusions in the embedding process, such that there may exist minor gaps or overlapping among the orthogonal projections of the first touch electrodes E1, the second touch electrodes E2, the electrode channel EC, and the conductive residual material RM onto the first surface SF1 of the substrate 110. However, such minor errors (e.g., the gaps and overlaps) caused by manufacturing processes are within the contemplated scope of the present disclosure.

In this embodiment, the second touch electrodes E2 are disposed along, for example, a y-axis in FIG. 6A. Two adjacent second touch electrodes E2 are electrically connected to each other via the electrode channel EC, and the heights of the second touch electrodes E2 relative to the surface SF1 of the substrate 110 are the same as the height of the electrode channel EC relative to the surface SF1 of the substrate 110.

In addition, the first touch electrodes E1 are disposed along, for example, an x-axis in FIG. 4A, in which the x-axis is perpendicular to the y-axis. Two adjacent first touch electrodes E1 are electrically connected to each other via the bridge BG. The heights of the first touch electrodes E1 and the second touch electrodes E2 relative to the surface SF1 of the substrate 110 are sufficiently different from the height of the conductive residual material RM relative to the surface SF1 of the substrate 110, so that the conductive residual material RM is electrically insulated from the first touch electrodes E1 and the second touch electrodes E2.

Furthermore, in this embodiment, each of the first touch electrodes E1 and the second touch electrodes E2 has a substantially diamond shape.

In addition, in this embodiment, all of the first touch electrodes E1, the second touch electrodes E2, the electrode channel EC, and the conductive residual material RM are completely embedded into the substrate 110. That is, all of the first touch electrodes E1, the second touch electrodes E2, the electrode channel EC, and the conductive residual material RM are not exposed on the surface SF1 or SF2 of the substrate 110. As a result, it is not necessary for the touch module 100 to have an additional passive layer thereon to protect or isolate the first touch electrodes E1, the second touch electrodes E2, the electrode channel EC, and/or the conductive residual material RM, as would be necessary were these elements exposed on the surfaces SF1, SF2 of the substrate 110, such that the time and costs associated with manufacturing the touch module 100 can be decreased. In addition, due to the fact that all of the first touch electrodes E1, the second touch electrodes E2, the electrode channel EC, and the conductive residual material RM are completely embedded in the substrate 110, the touch module 100 can better formed as an integrated system, and the subsequent manufacturing and assembly processes of the touch module 100 (e.g., to form a display module) are facilitated.

In this embodiment, in order to avoid exposing any one of the first touch electrodes E1, the second touch electrodes E2, the electrode channel EC, and the conductive residual material RM on the surface SF2 of the substrate 110, the embedding depth (e.g., H0-H1) of the first touch electrodes E1, the second touch electrodes E2, the electrode channel EC, and the conductive residual material RM (e.g., the first touch electrodes E1) which is closest to the surface SF2 of the substrate 110 is substantially between 10 and 500 nanometers relative to the surface SF2 of the substrate 110.

Figure 7A:
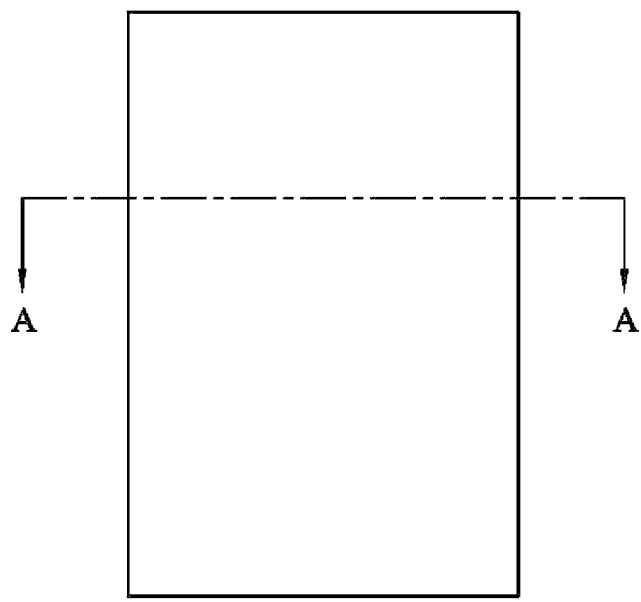
FIG. 7A illustrates a manufacturing method of a touch module according to one or more embodiments of the present disclosure.
Figure 7B:
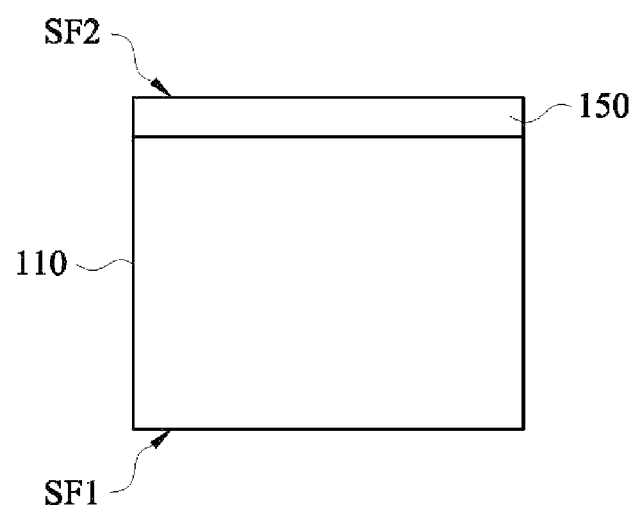
FIG. 7B is a sectional view of the touch module along lines A-A in FIG. 7A according to one or more embodiments of the present disclosure.

Reference is made to FIG. 7A and FIG. 7B. In one or more embodiments of the present disclosure, the first step corresponding to FIG. 1A and FIG. 1B can be replaced by the following steps. First, a fundamental conductive material layer 150 is provided on the second surface SF2 of the substrate 110. Subsequently, an embedding ink without conductive additive is provided on the fundamental conductive material layer 150, such that the fundamental conductive material layer 150 is embedded into the substrate 110 to form the first conductive material layer 120.

The fundamental conductive material layer 150 can be formed by a material identical to the conductive additive mentioned above. Details of the embedding ink without conductive additive can be ascertained by referring to the paragraphs described above, and a description in this regard will not be repeated herein.

Figure 8A:
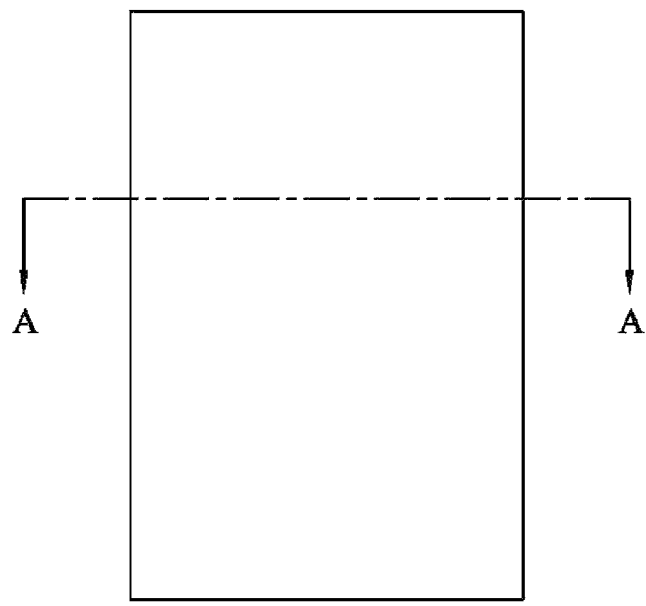
FIG. 8A illustrates a manufacturing method of a touch module according to one or more embodiments of the present disclosure.
Figure 8B:
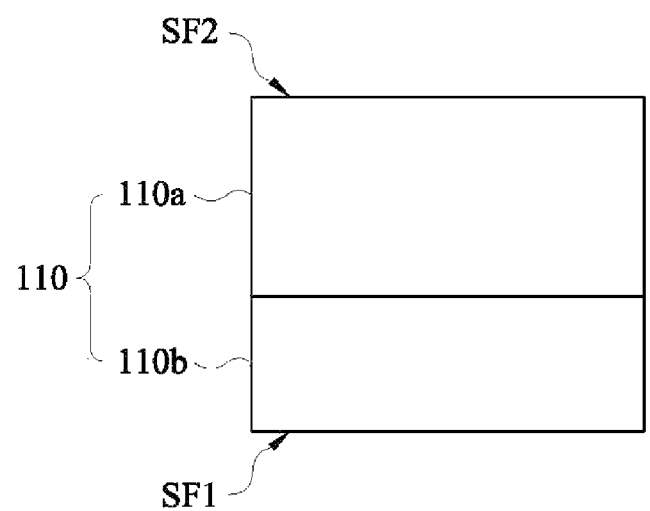
FIG. 8B is a sectional view of the touch module along lines A-A in FIGS. 9A-12A according to one or more embodiments of the present disclosure.

Reference is made to FIG. 8A and FIG. 8B. In one or more embodiments, the substrate 110 includes an active layer 110a and a base layer 110b. The active layer 110a can be disposed on the base layer 110b. The first touch electrodes E1, the second touch electrodes E2, the electrode channel EC, and the conductive residual material RM are embedded in the active layer 110a of the substrate 110.

In one or more embodiments, the base layer 110b may be made by a rigid material or a flexible material. The base layer 110b can be made by using polymethyl methacrylate (PMMA), polycarbonate (PC), polyethylene terephthalate (PET), cyclo olefin polymer (COP), or another suitable high polymer material, but is not limited in this regard. In one or more embodiments, the thickness of the base layer 110b is substantially between 50 and 500 micrometers. The active layer 110a can be made by using polycarbonate (PC), polyvinyl chloride (PVC), polystyrene, and/or another suitable high polymer material, but is not limited in this regard. In one or more embodiments, the thickness of the active layer 110a is substantially between 0.1 and 50 micrometers.

Second Embodiment

In the paragraphs below, a manufacturing method of a touch module 200 is described. The manufacturing method of the touch module 200 is substantially identical to the manufacturing method of the touch module 100 described above. The main difference is the order of forming the first touch electrodes E1, the assembly of the second touch electrodes E2 and the electrode channel EC, and the conductive residual material RM. Thus, many aspects that are similar will not be repeated in the description below.

FIGS. 9A-14A illustrate a manufacturing method of a touch module 200 according to one or more embodiments of the present disclosure. FIGS. 9B-14B are sectional views of the touch module 200 along lines A-A in FIGS. 9A-14A according to one or more embodiments of the present disclosure.

Figure 9A:
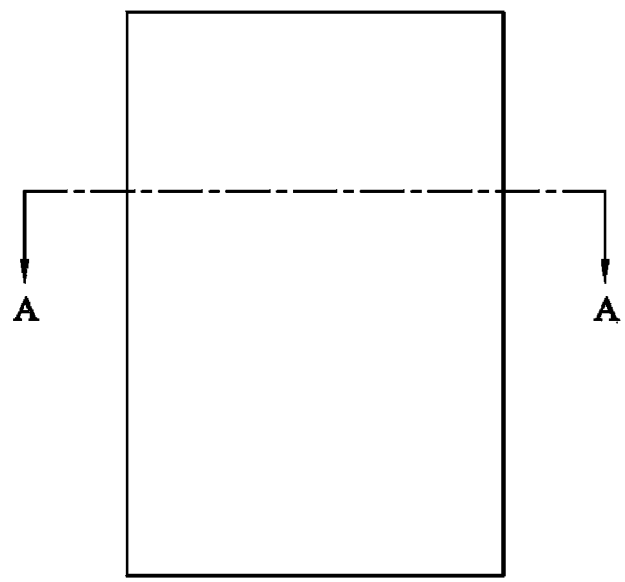
Figure 9B:
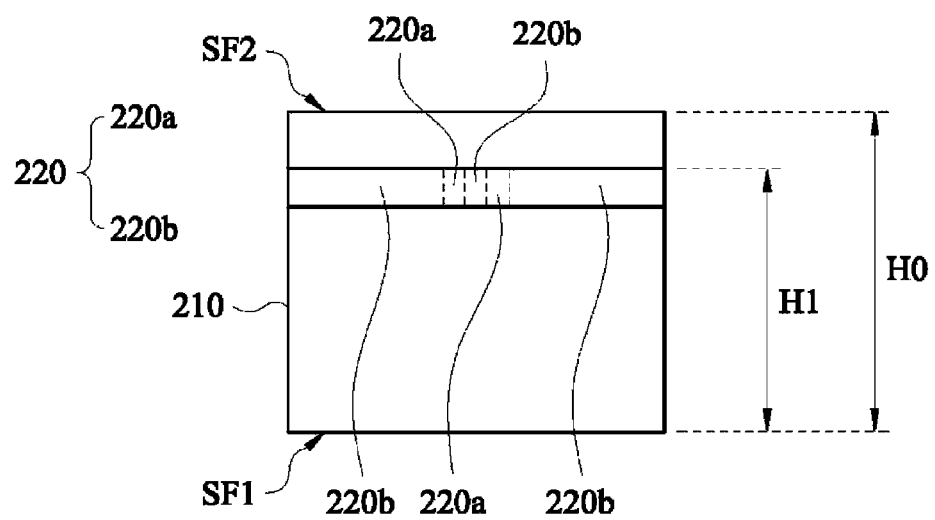

Particular reference is made to FIG. 9A and FIG. 9B. In a first step, a first conductive material layer 220 is embedded into a substrate 210 to a height H1 relative to a first surface SF1 of the substrate 210. The first conductive material layer 220 includes a first retention portion 220a and a first embedding portion 220b.

Figure 10A:
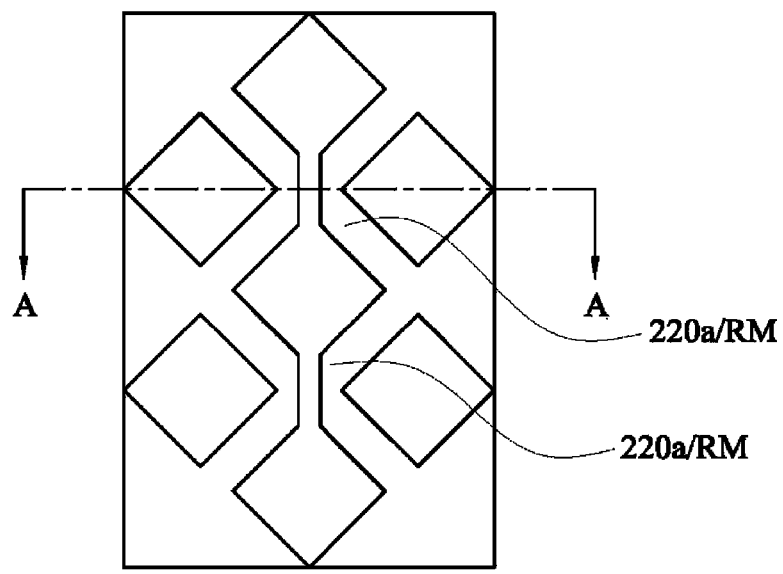
Figure 10B:
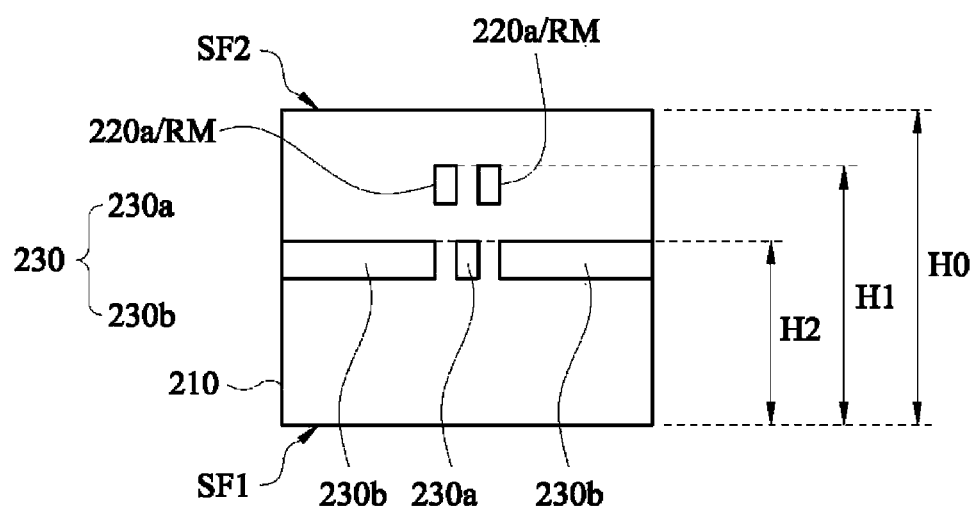

Particular reference is made to FIG. 10A and FIG. 10B. In a second step, the first embedding portion 220b of the first conductive material layer 220 is further embedded into the substrate 210 to a height H2 relative to the first surface SF1 of the substrate 210, so as to form a second conductive material layer 230, and the first retention portion 220a of the first conductive material layer 220 is retained at the height H1 relative to the first surface SF1 of the substrate 210. The second conductive material layer 230 includes a second embedding portion 230b and a second retention portion 230a.

Figure 11A:
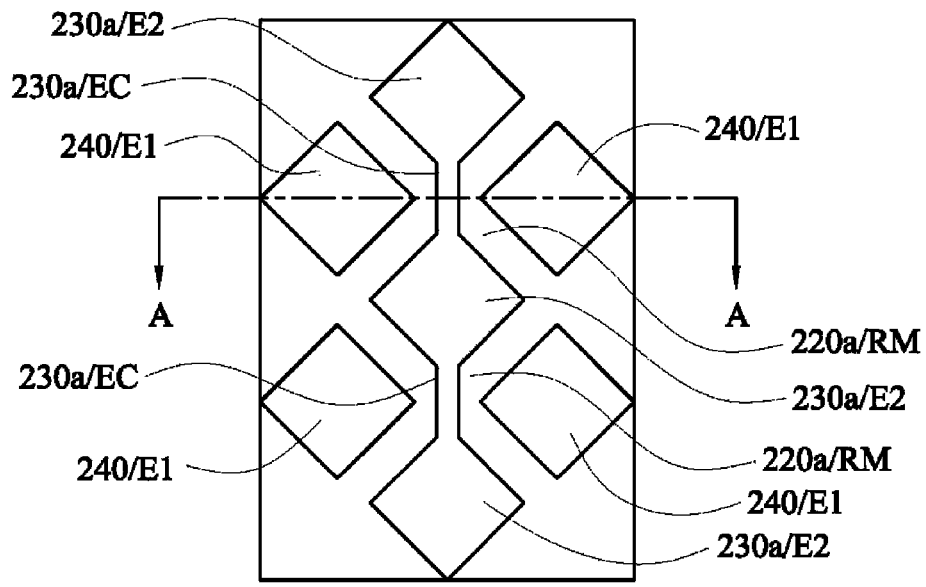
Figure 11B:
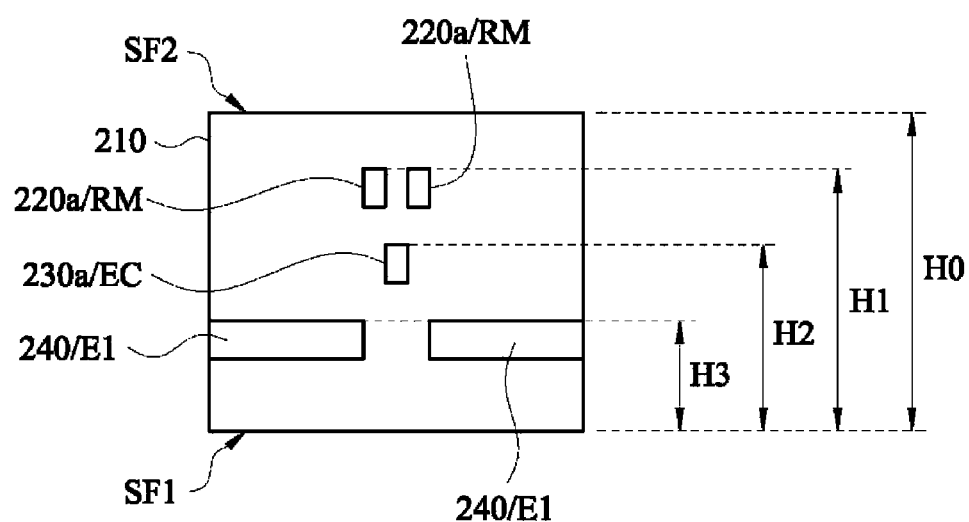

Particular reference is made to FIG. 11A and FIG. 11B. In a third step, the second embedding portion 230b of the second conductive material layer 230 is further embedded into the substrate 210 to a height H3 relative to the first surface SF1 of the substrate 210, so as to form a third conductive material layer 240, and the second retention portion 230a of the second conductive material layer 230 is retained at the height H2 relative to the first surface SF1 of the substrate 210. In this embodiment, the first retention portion 220a includes a conductive residual material RM of the touch module 200, the second retention portion 230a includes an assembly of the second touch electrodes E2 and the electrode channel EC of the touch module 200, and the third conductive material layer 240 includes the first touch electrodes E1 of the touch module 200.

Figure 12A:
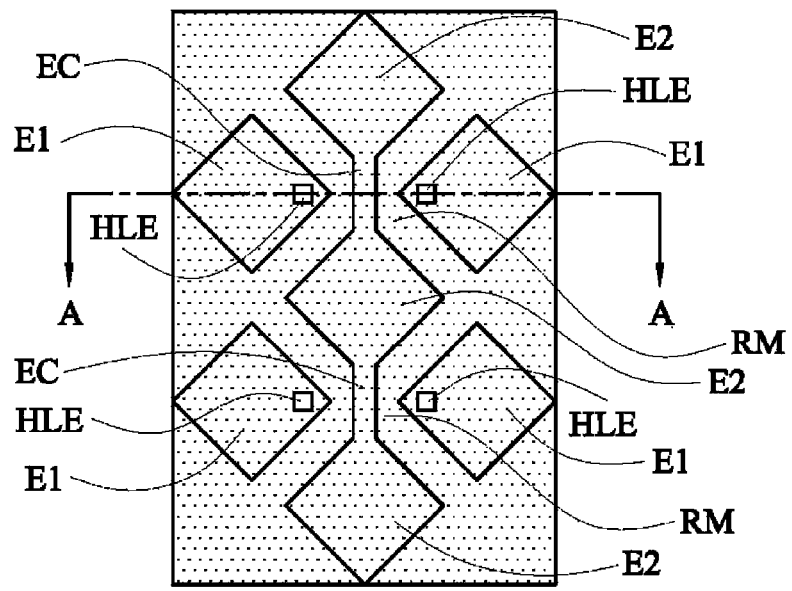
Figure 12B:
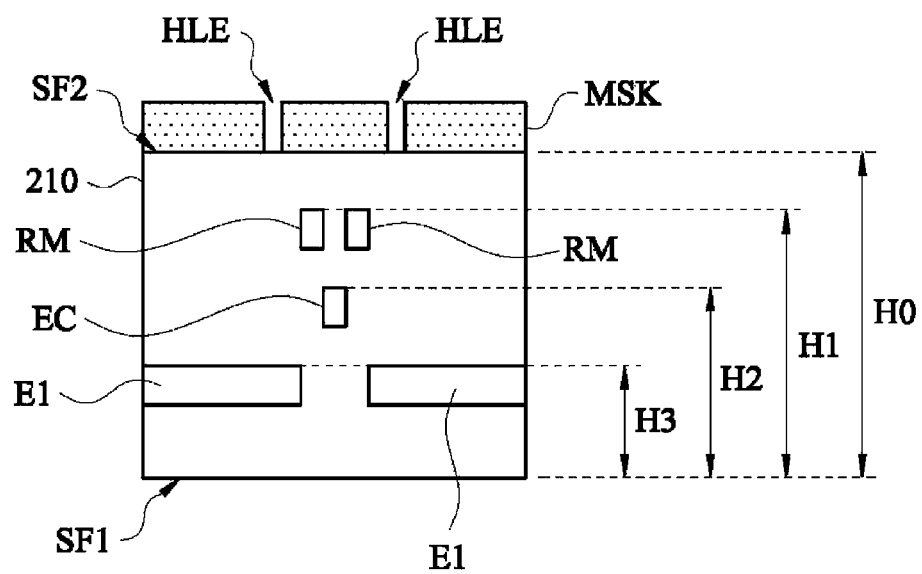

Particular reference is made to FIG. 12A and FIG. 12B. In a fourth step, a mask MSK is provided on the first surface SF1 or the second surface SF2 of the substrate 210 (in this embodiment, the second surface SF2 is used as an example), and at least two opening portions HLE of the substrate 210 are exposed.

Figure 13A:
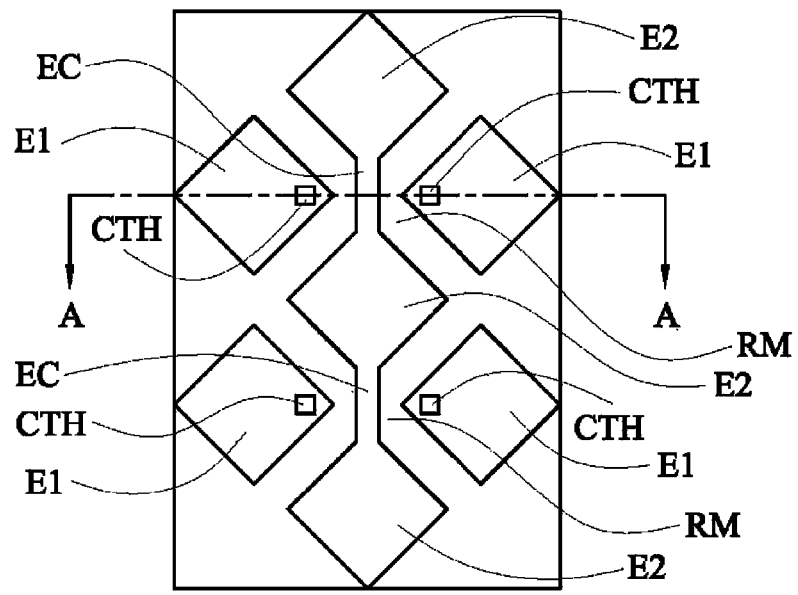
Figure 13B:
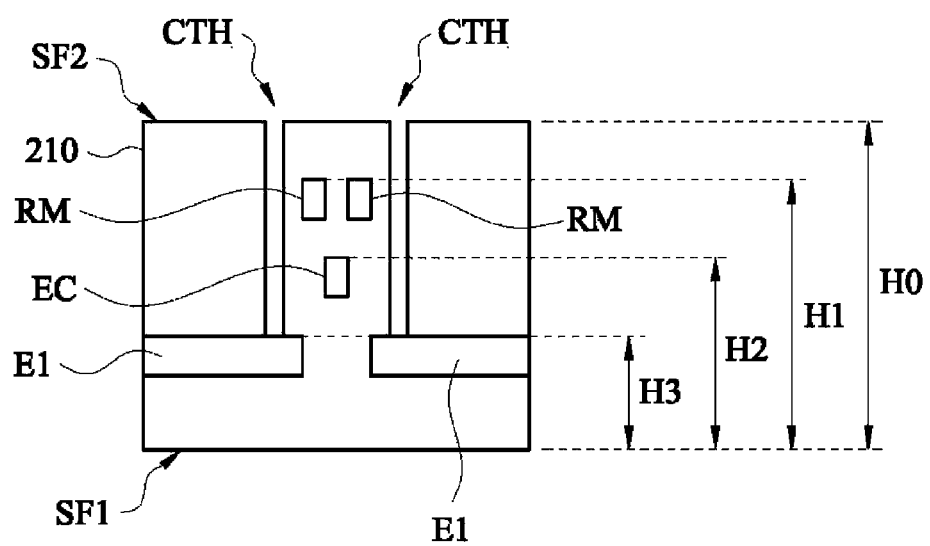

Particular reference is made to FIG. 13A and FIG. 13B. In a fifth step, the opening portions HLE of the substrate 210 are removed to form at least two contact holes CTH. The contact holes CTH are separately disposed on the first touch electrodes E1, and are configured to expose portions of the first touch electrodes E1 embedded in the substrate 210. In this embodiment, the mask MSK on the substrate 210 can be simultaneously removed in the process of removing the opening portions HLE of the substrate 210.

Compared to the touch module 100 in the first embodiment, since the first touch electrodes E1 of the touch module 200 in this embodiment are deeper, the contact holes CTH of the touch module 200 in this embodiment are also deeper.

Figure 14A:
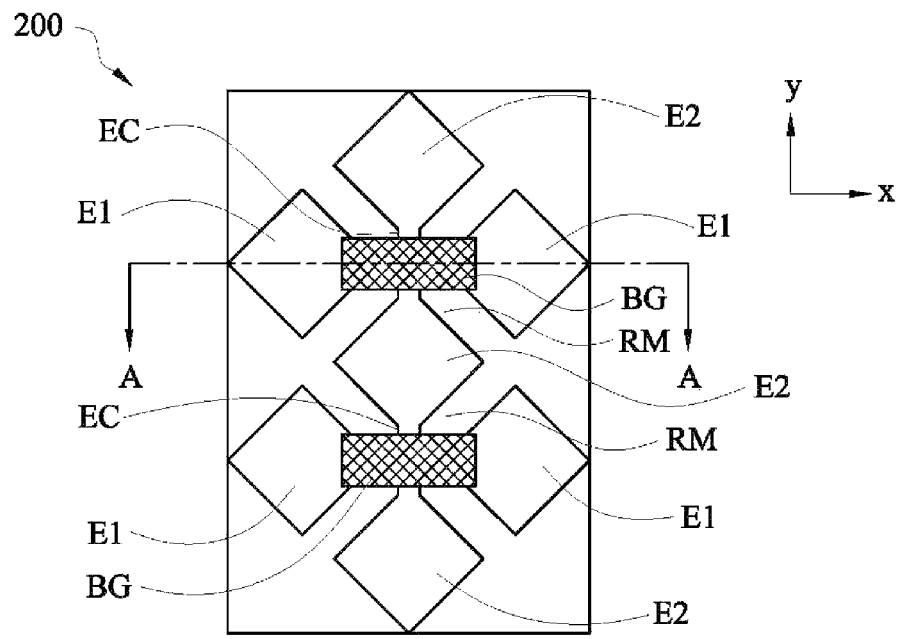
Figure 14B:
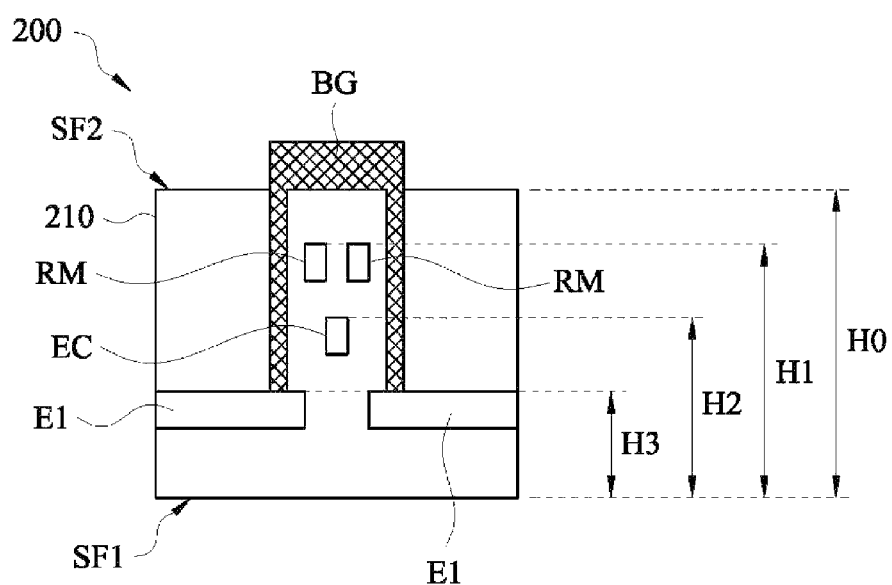

Particular reference is made to FIG. 14A and FIG. 14B. In a sixth step, a bridge BG is provided. The bridge BG crosses the electrode channel EC and is configured to electrically connect two adjacent first touch electrodes E1 to each other. In one or more embodiments, the bridge BG electrically connects two adjacent first touch electrodes E1 via the contact holes CHT.

Through the operations mentioned above, the touch module 200 can be realized. By patterning the first and second touch electrodes E1, E2 and the electrode channel EC with such an embedding process and instead of using an etching process, the problem of adversely affecting the optical consistency in the appearance of the touch module 200 caused by uneven refractive indexes of the touch module 200 can be avoided.

It should be noted that, in the first step of this embodiment illustrated in FIG. 9A and FIG. 9B, the first conductive material layer 220 can be embedded into the substrate 210 in a manner similar to the method illustrated in FIG. 7A and FIG. 7B. In addition, in this embodiment, the substrate 210 may include a base layer and an active layer as illustrated in FIG. 8A and FIG. 8B.

Moreover, it should be noted that the order of forming the first touch electrodes E1, the assembly of the second touch electrodes E2 and the electrode channel EC, and the conductive residual material RM can be altered on the basis of actual requirements, and the present disclosure is not limited to the embodiment described above.

Third Embodiment

In the paragraphs below, a manufacturing method of a touch module 300 is described. The manufacturing method of the touch module 300 is substantially identical to the manufacturing method of the touch module 100 described above. Thus, many aspects that are similar will not be repeated in the description below.

FIGS. 15A-21A illustrate a manufacturing method of a touch module 300 according to one or more embodiments of the present disclosure. FIGS. 15B-21B are sectional views of the touch module 300 along lines A-A in FIGS. 15A-21A according to one or more embodiments of the present disclosure.

Figure 15A:
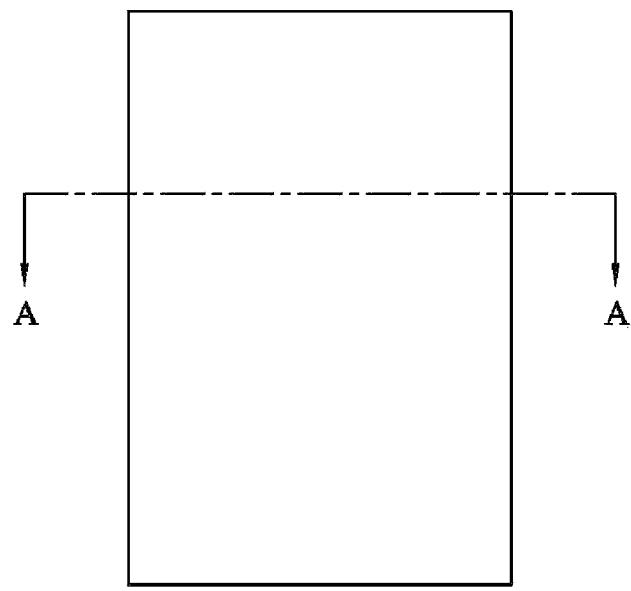
Figure 15B:
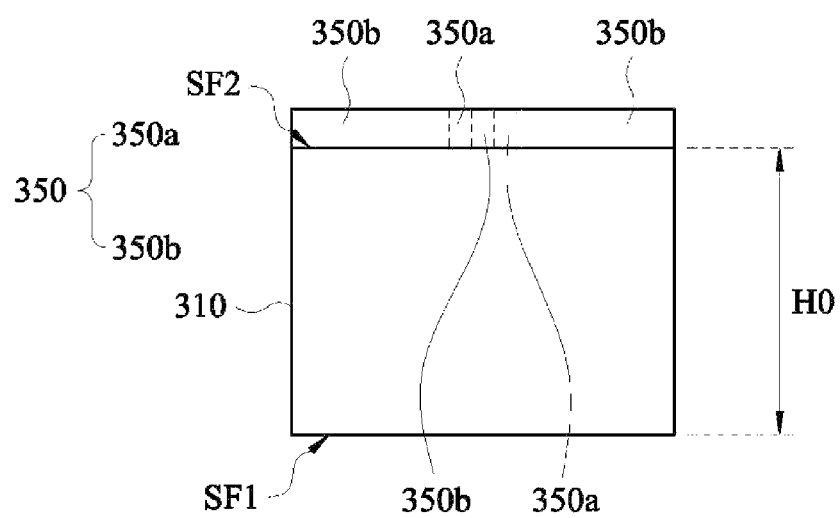

Particular reference is made to FIG. 15A and FIG. 15B. In a first step, a fundamental conductive material layer 350 is provided on the second surface SF2 of the substrate 310. The fundamental conductive material layer 350 includes a fundamental retention portion 350a and a fundamental embedding portion 350b.

In one or more embodiments, the fundamental conductive material layer 350 can be formed by a material identical to the conductive additive mentioned above, and details in this regard will not be repeated herein.

Figure 16A:
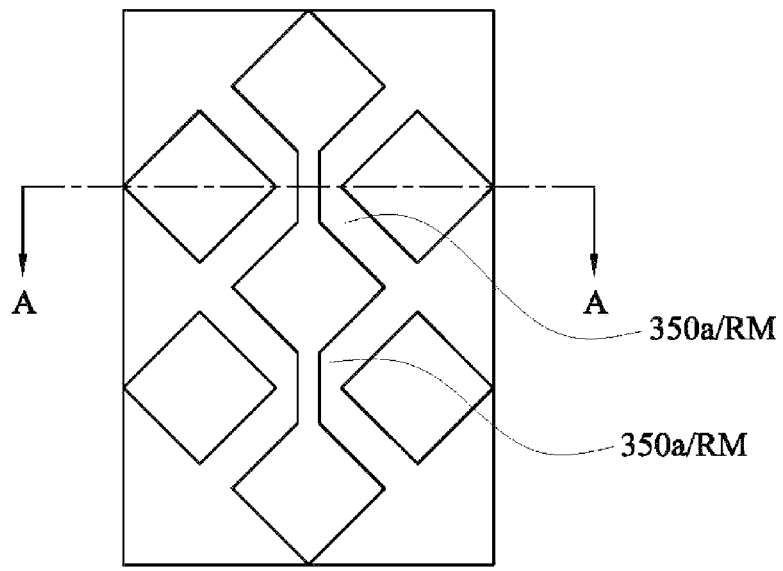
Figure 16B:
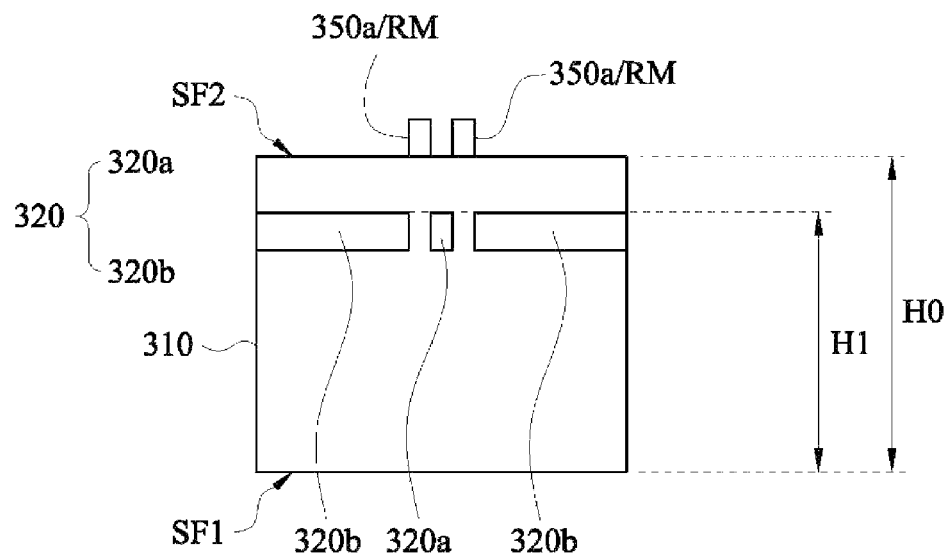

Particular reference is made to FIG. 16A and FIG. 16B. In a second step, the fundamental embedding portion 350b of the fundamental conductive material layer 350 is embedded into the substrate 310 to a height H1 relative to the first surface SF1 of the substrate 310, so as to form a first conductive material layer 320, and the fundamental retention portion 350a of the fundamental conductive material layer 350 is retained on the second surface SF2 of the substrate 310 to form a conductive residual material RM. The first conductive material layer 320 includes a first retention portion 320a and a first embedding portion 320b. In one or more embodiments, a difference between the height H1 and the thickness H0 of the substrate 310 is greater than 50 nanometers, such that the fundamental retention portion 350a retained on the second surface SF2 of the substrate 310 and the first conductive material layer 320 with the height H1 are insulated from each other.

In this embodiment, the fundamental embedding portion 350b of the fundamental conductive material layer 350 is embedded into the substrate 310 to the height H1 relative to the first surface SF1 of the substrate 310 by providing an embedding ink without conductive additive on the fundamental embedding portion 350b of the fundamental conductive material layer 350.

It is noted that details of the conductive residual material RM and the embedding ink without conductive additive can be ascertained by referring to the paragraphs above, and a description in this regard will not be repeated.

Figure 17A:
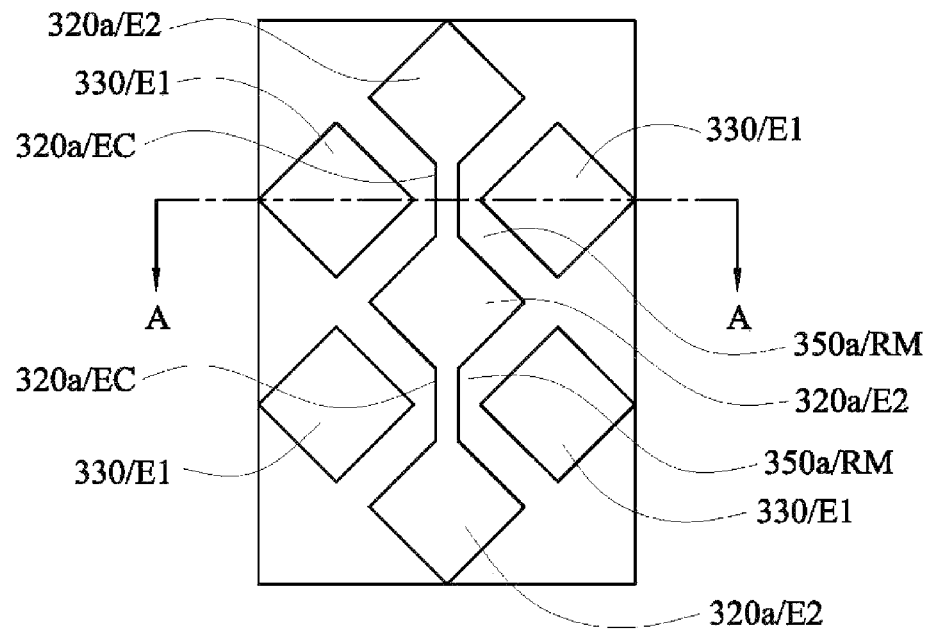
Figure 17B:
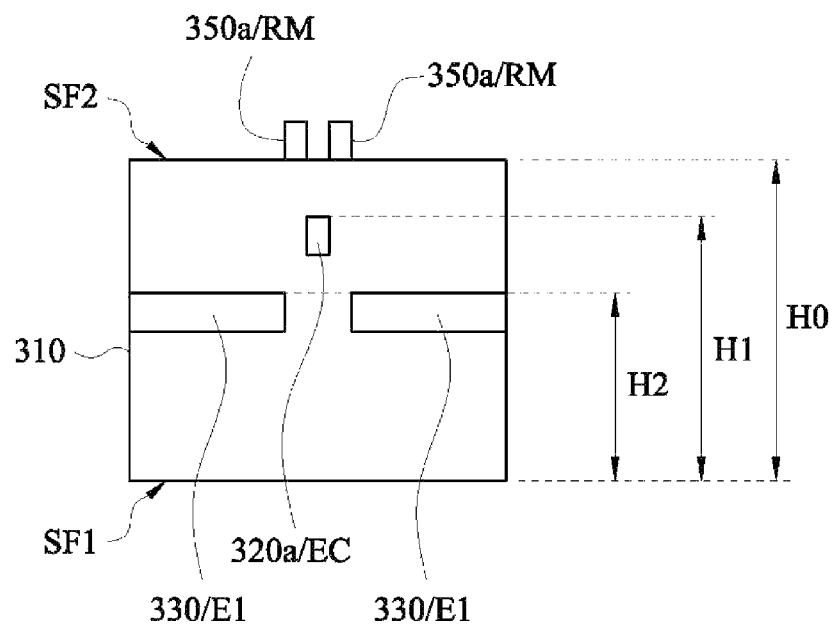

Particular reference is made to FIG. 17A and FIG. 17B. In a third step, the first embedding portion 320b of the first conductive material layer 320 is further embedded into the substrate 310 to a height H2 relative to the first surface SF1 of the substrate 310, so as to form a second conductive material layer 330, and the first retention portion 320a of the first conductive material layer 320 is retained at the height H1 relative to the first surface SF1 of the substrate 210. The height H2 and the height H1 are different from each other. In one or more embodiments, a difference between the height H2 and the height H1 is greater than substantially 50 nanometers, such that the first retention portion 320a with the height H1 and the second conductive material layer 330 with the height H2 are insulated from each other.

In this embodiment, the first embedding portion 320b of the first conductive material layer 320 is embedded into the substrate 310 to the height H2 relative to the first surface SF1 of the substrate 310 by providing an embedding ink without conductive additive on the second surface SF2 of the substrate 310 corresponding to the first embedding portion 320b of the first conductive material layer 320.

In some embodiments of the present disclosure, the first retention portion 320a includes first touch electrodes E1, and the second conductive material layer 330 includes second touch electrodes E2 and an electrode channel EC; or the first retention portion 320a includes the second touch electrodes E2 and the electrode channel EC, and the second conductive material layer 330 includes the first touch electrodes E1. In this embodiment, as an example, the first retention portion 320a includes the second touch electrodes E2 and the electrode channel EC, and the second conductive material layer 330 includes the first touch electrodes E1.

Figure 18A:
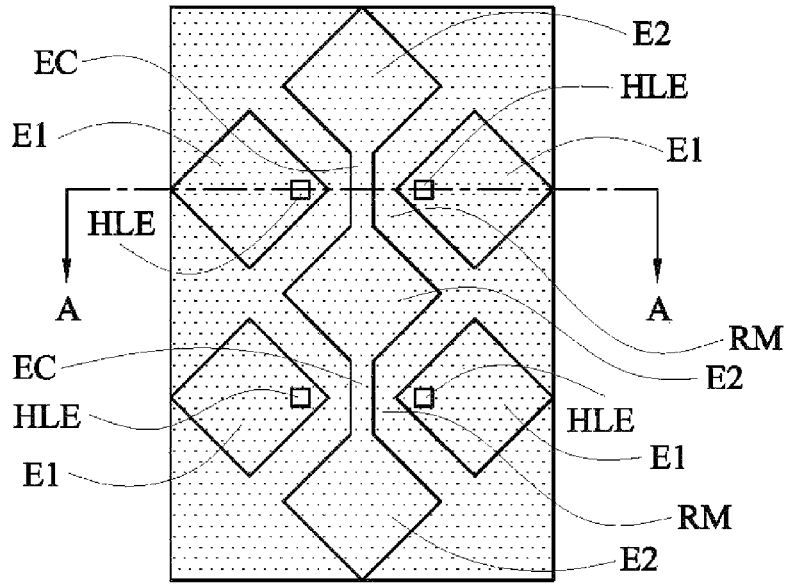
Figure 18B:
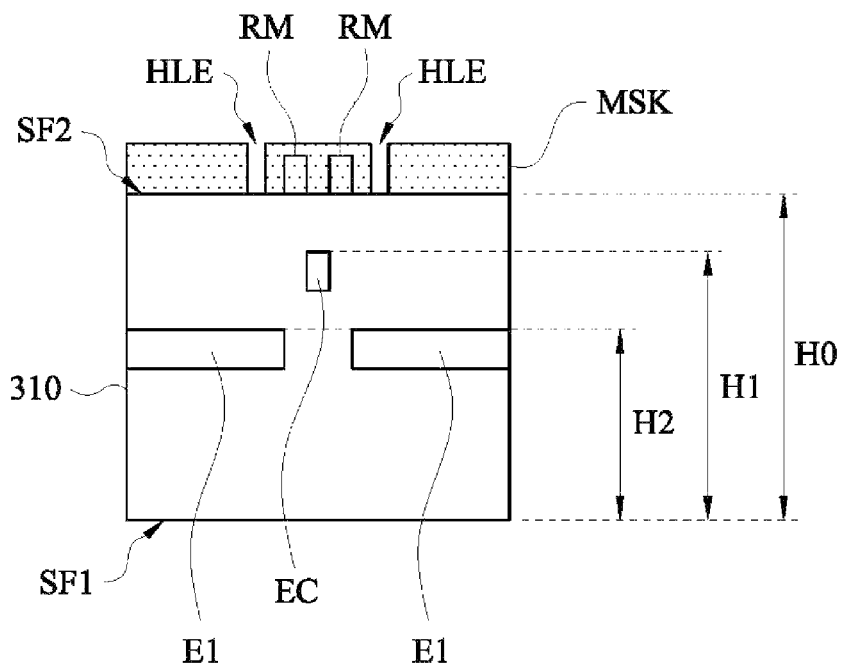

Particular reference is made to FIG. 18A and FIG. 18B. In a fourth step, a mask MSK is provided on the first surface SF1 or the second surface SF2 of the substrate 310 (in this embodiment, the second surface SF2 is used as an example), and at least two opening portions HLE of the substrate 310 are exposed.

Figure 19A:
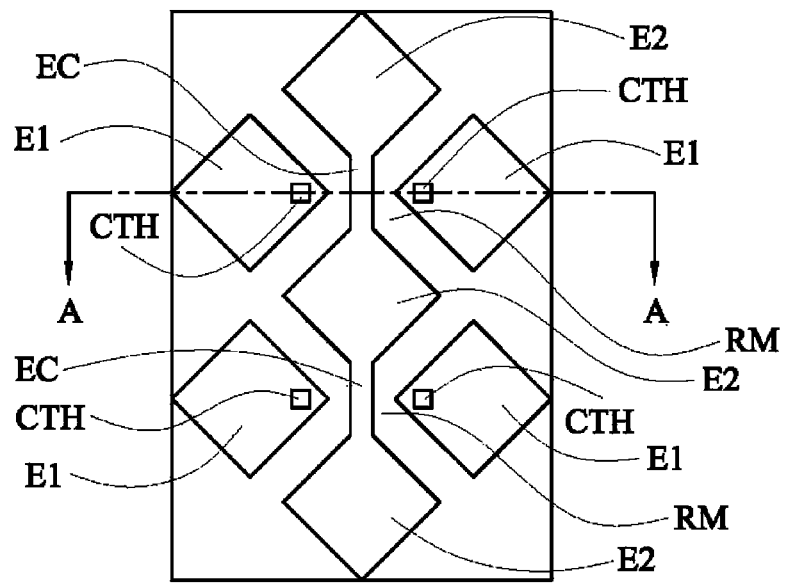
Figure 19B:
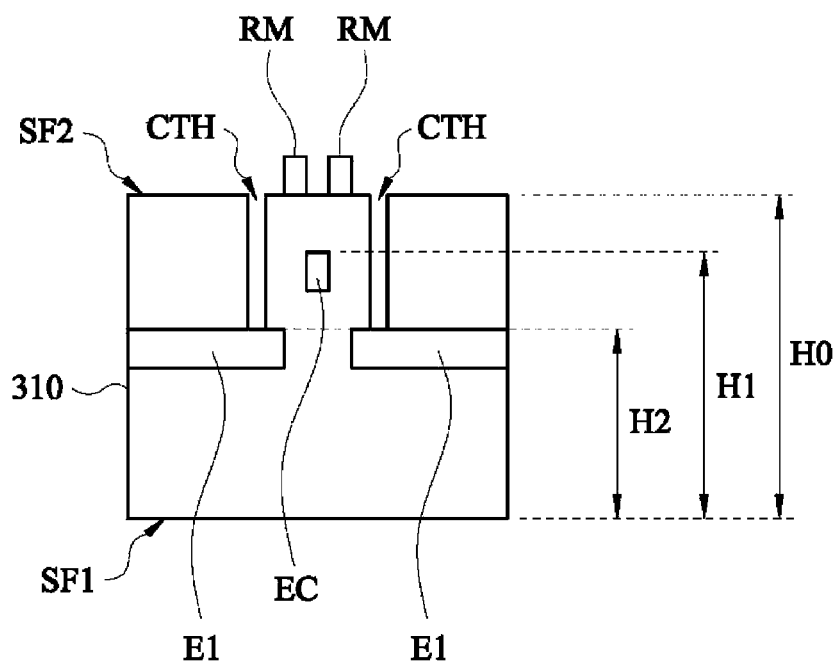

Particular reference is made to FIG. 19A and FIG. 19B. In a fifth step, the opening portions HLE of the substrate 310 are removed to form at least two contact holes CTH. The contact holes CTH are separately disposed on the first touch electrodes E1, and are configured to expose portions of the first touch electrodes E1 embedded in the substrate 310. In this embodiment, the mask MSK on the substrate 310 can be simultaneously removed in the process of removing the opening portions HLE of the substrate 310.

Figure 20A:
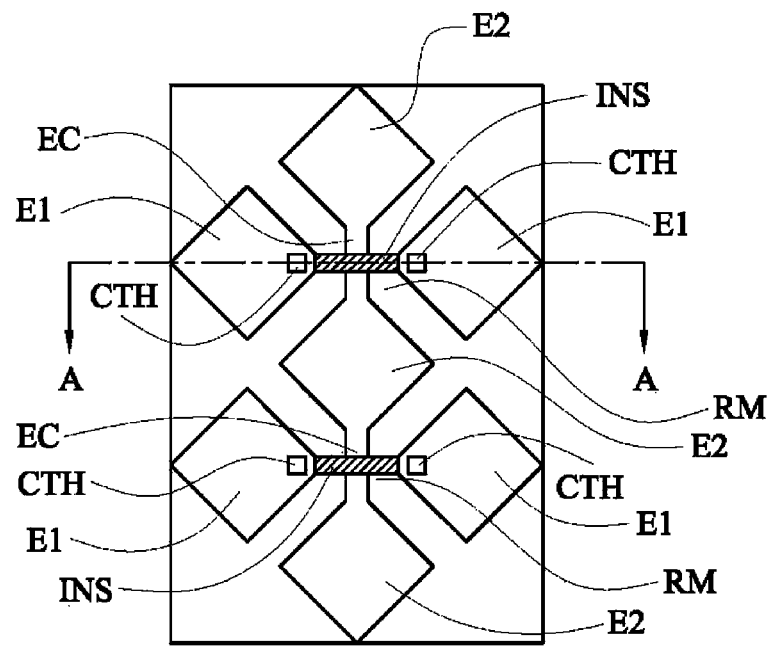
Figure 20B:
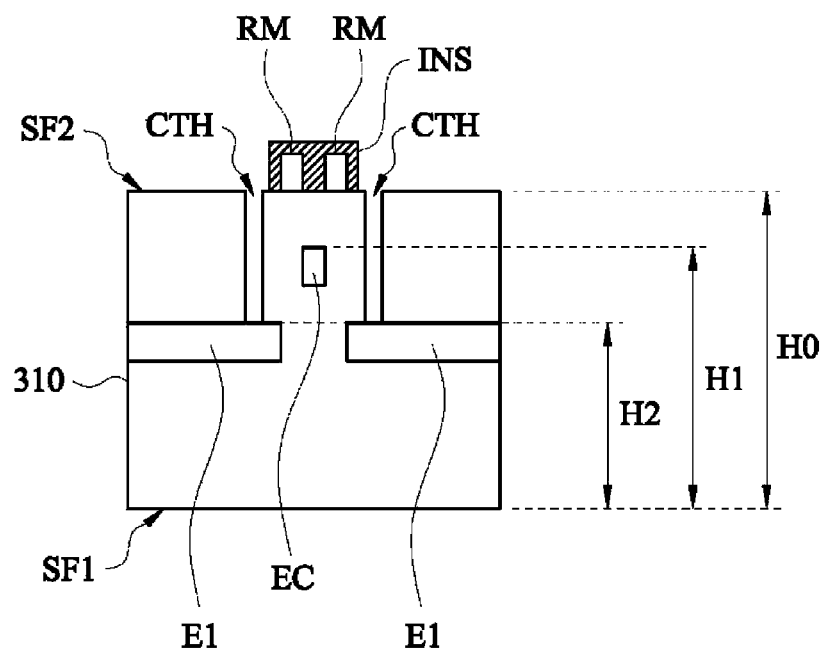

Particular reference is made to FIG. 20A and FIG. 20B. In a sixth step, an insulator layer INS is provided on the conductive residual material RM and covers the conductive residual material RM. The insulator layer INS is configured to isolate the conductive residual material RM from a bridge BG.

Figure 21A:
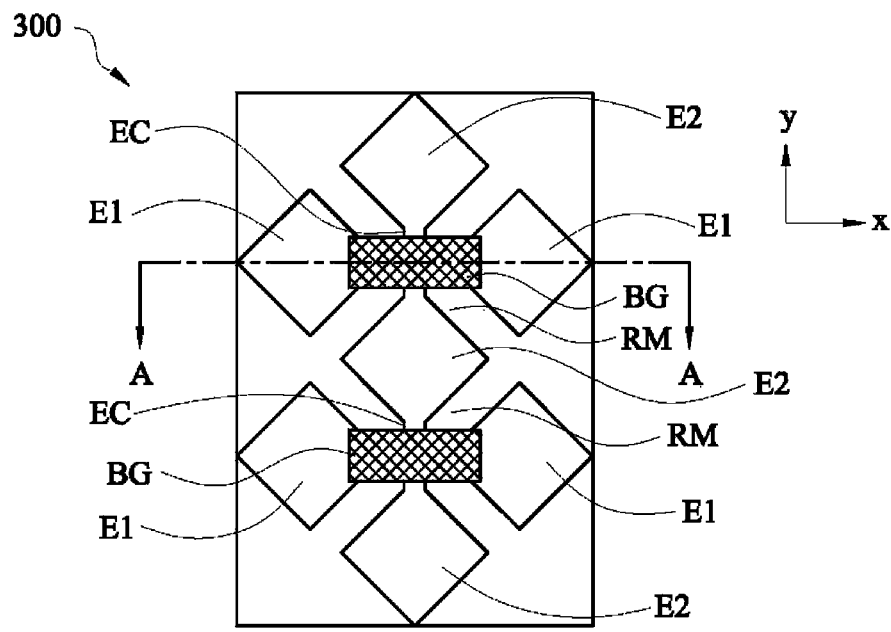
Figure 21B:
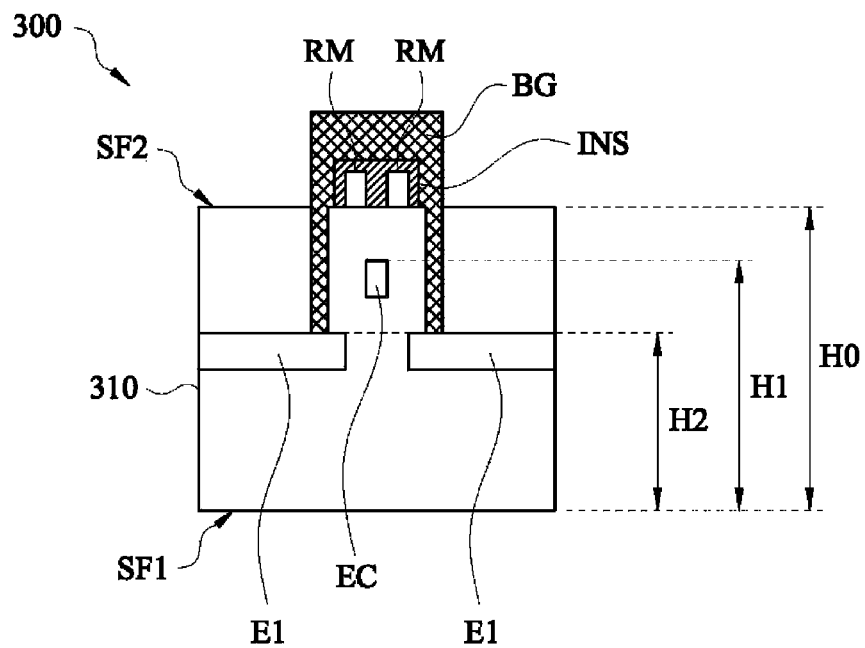

Particular reference is made to FIG. 21A and FIG. 21B. In a seventh step, at least one bridge BG is provided. The bridge BG crosses the electrode channel EC and is configured to electrically connect two adjacent first touch electrodes E1 to each other. In one or more embodiments, the bridge BG electrically connects two adjacent first touch electrodes E1 via the contact holes CHT.

Through the operations mentioned above, the touch module 300 can be realized. By patterning the first and second touch electrodes E1, E2 and the electrode channel EC with such an embedding process and instead of using an etching process, the problem of adversely affecting the optical consistency in the appearance of the touch module 300 caused by uneven refractive indexes of the touch module 300 can be avoided.

Similarly, in this embodiment, substantially no gap or overlap is present among the orthogonal projections of the first touch electrodes E1, the second touch electrodes E2, the electrode channel EC, and the conductive residual material RM onto the first surface SF1 of the substrate 310. As a result, the problem of adversely affecting the optical consistency in the appearance of the touch module 300 caused by uneven refractive indexes of the touch module 300 can be avoided.

In this embodiment, the heights of the first touch electrodes E1, the second touch electrodes E2, and the conductive residual material RM relative to the surface SF1 of the substrate 310 are sufficiently different from each other, so that the first touch electrodes E1, the second touch electrodes E2, and the conductive residual material RM are insulated from each other.

In addition, in this embodiment, all of the first touch electrodes E1, the second touch electrodes E2, and the electrode channel EC are completely embedded into the substrate 310. That is, all of the first touch electrodes E1, the second touch electrodes E2, and the electrode channel EC are not exposed on the surface SF1 or SF2 of the substrate 310. As a result, it is not necessary for the touch module 300 to have an additional passive layer thereon to protect or isolate the first touch electrodes E1, the second touch electrodes E2, and/or the electrode channel EC, as would be necessary were these elements exposed on the surfaces SF1, SF2 of the substrate 310, such that the time and costs associated with manufacturing the touch module 300 can be decreased.

It should be noted that, in this embodiment, the substrate 310 may include a base layer and an active layer as illustrated in FIG. 8A and FIG. 8B, but is not limited to such an embodiment.

In addition, it should be noted that the order of forming the first touch electrodes E1, the assembly of the second touch electrodes E2 and the electrode channel EC, and the conductive residual material RM can be altered on the basis of actual requirements, and the present disclosure is not limited to the embodiment described above.

Reference is made to FIGS. 22A-23A and FIGS. 22B-23B. In an alternative embodiment of the present disclosure, a single insulator layer INS' is provided to isolate a plurality of bridges from the conductive residual material RM, such that the manufacturing process of the touch module 300' can be simplified.

Figure 22A:
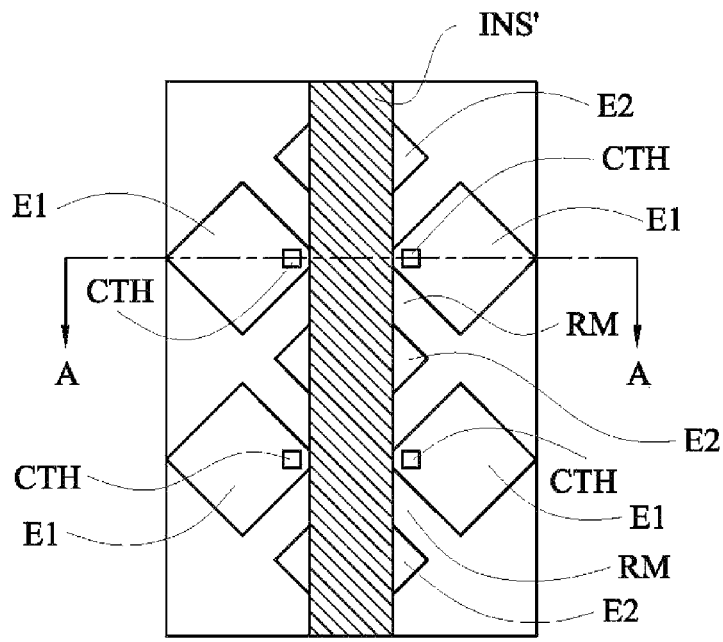
Figure 22B:
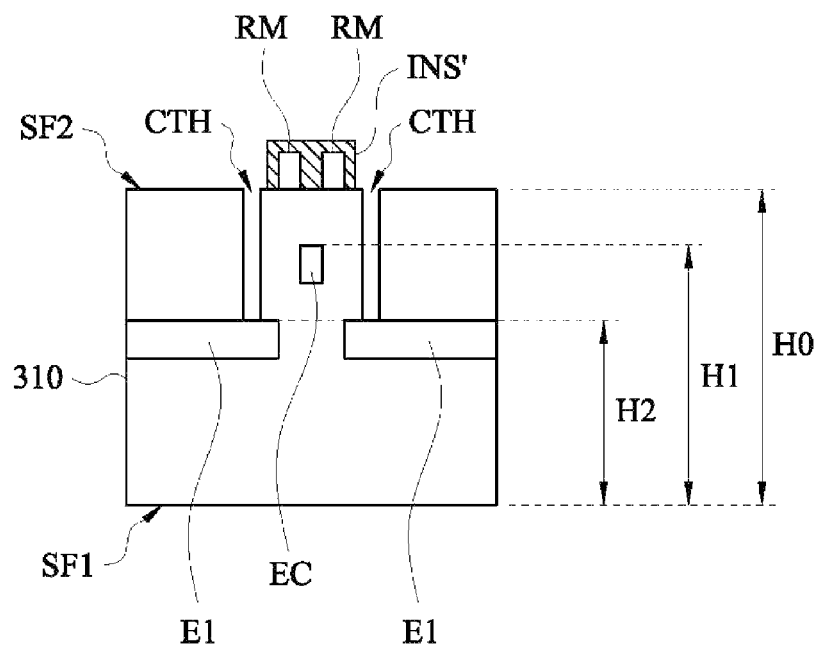

Particular reference is made to FIG. 22A and FIG. 22B. In the sixth step mentioned above, an insulator layer INS' extended along the y-axis is provided and covers a portion of the conductive residual material RM lined in a column.

Figure 23A:
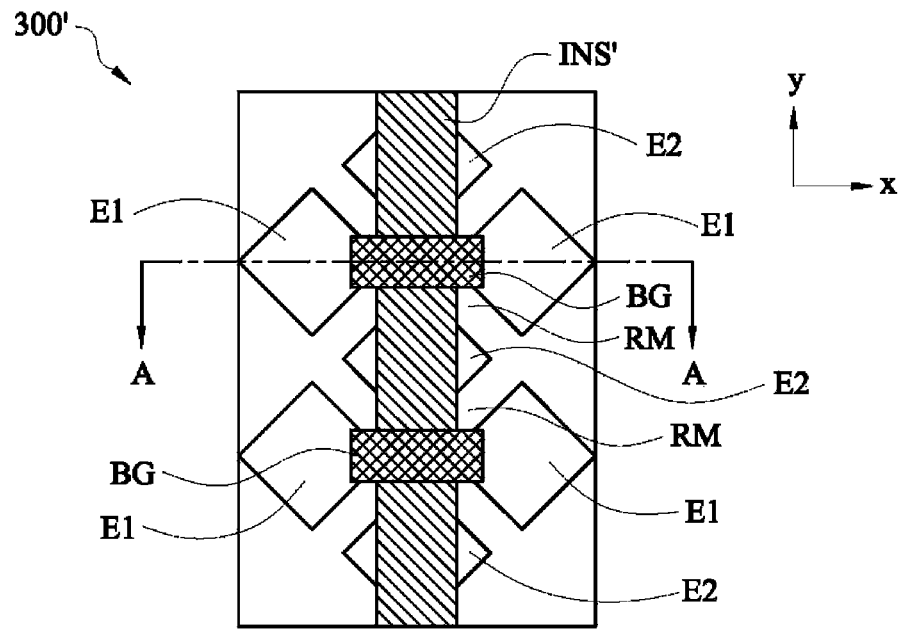
Figure 23B:
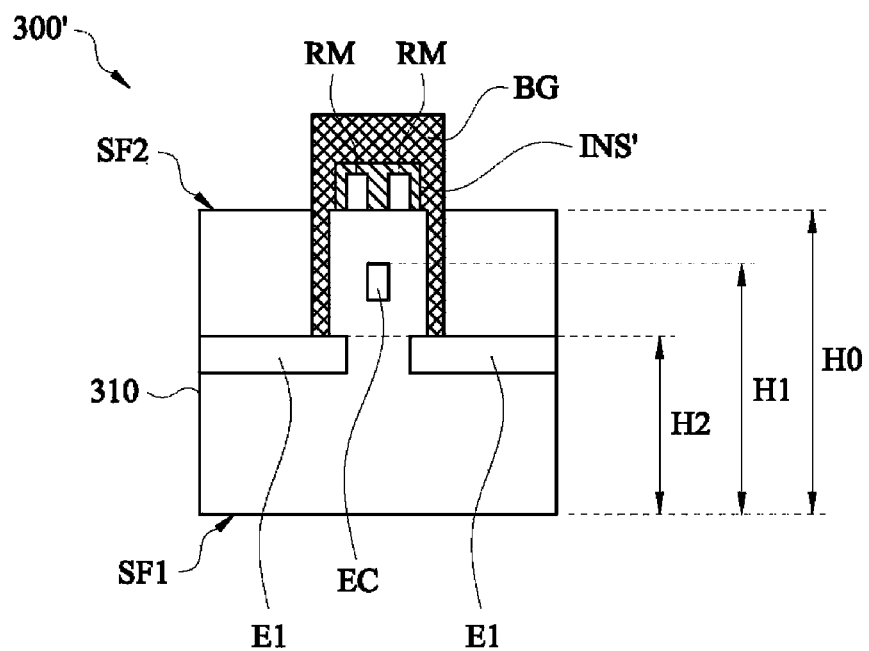

Particular reference is made to FIG. 23A and FIG. 23B. In the seventh step mentioned above, at least two bridges BG crossing the insulator layer INS' are provided. The bridges BG cross different electrode channels EC. Each of the bridges BG is configured to electrically connect two adjacent first touch electrodes E1 via the contact holes CHT, so as to connect two adjacent first touch electrodes E1 to each other.

In this embodiment, the insulator layer INS' can be used to isolate the conductive residual material RM from at least two bridges BG, instead of being used to isolate the conductive residual material RM from simply one bridge BG as described in the embodiment described above. Thus, through the operations described above, the manufacturing process of the touch module 300' can be simplified.

Reference is made to FIGS. 24A-26A and FIGS. 24B-26B. In another alternative embodiment of the present disclosure, an insulator layer INS" is used to replace the mask MSK in the fourth step described above, so as to simplify the manufacturing process of the touch module 300".

Figure 24A:
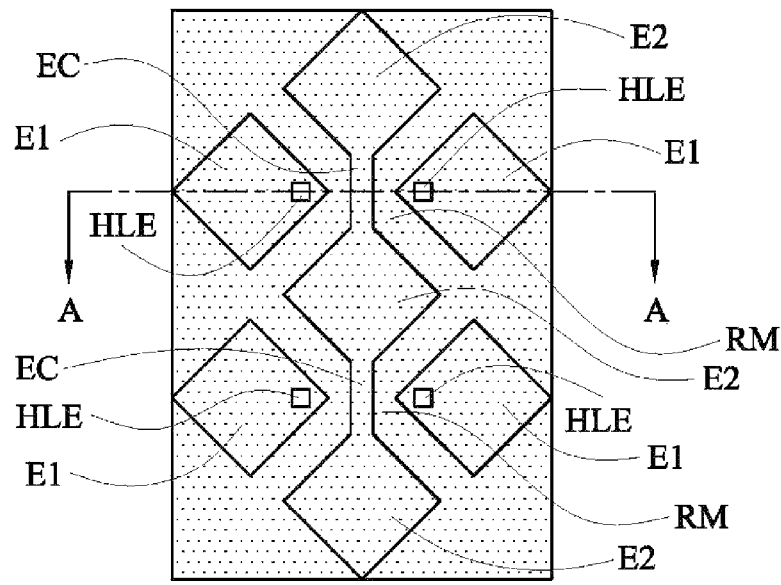
Figure 24B:
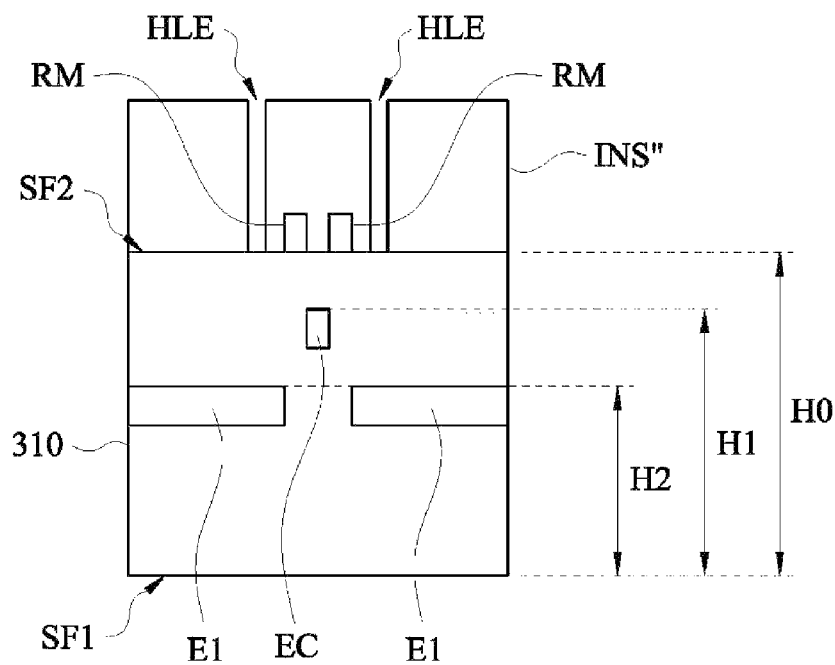

Particular reference is made to FIG. 24A and FIG. 24B. In the fourth step described above, a thicker insulator layer INS" (e.g., thicker than the insulator layer INS) is provided on the substrate 310 to cover the substrate 310 and expose two opening portions HLE of the substrate 310.

Figure 25A:
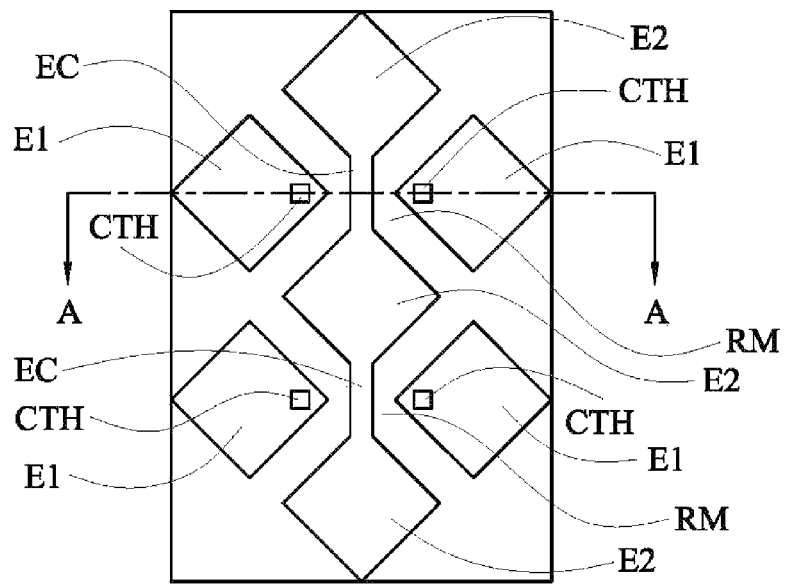
Figure 25B:
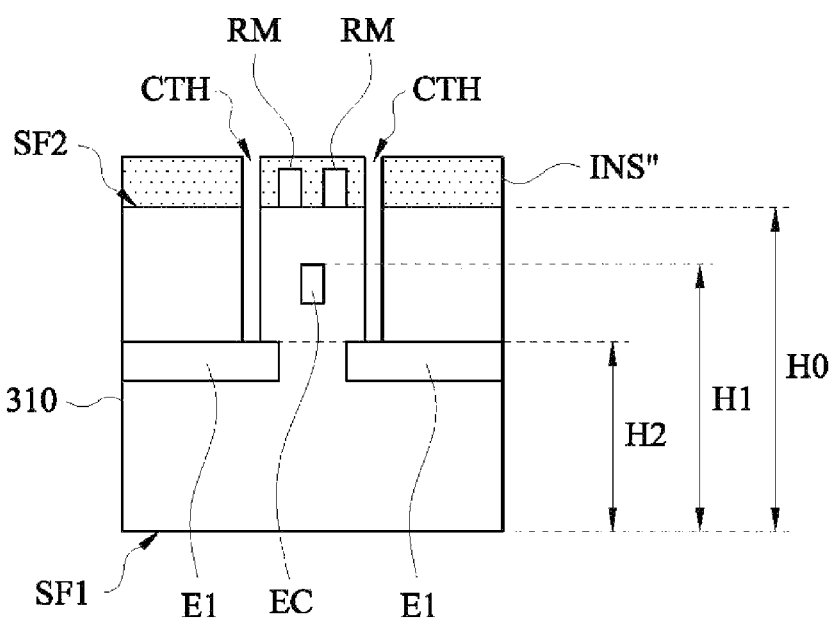

Particular reference is made to FIG. 25A and FIG. 25B. In a fifth step, a part of the insulator layer INS" is etched off, and the opening portions HLE of the substrate 310 are removed to form at least two contact holes CTH. The contact holes CTH are separately disposed on the first touch electrodes E1, and are configured to expose portions of the first touch electrodes E1 embedded in the substrate 310. It should be noted that, in this step, although the insulator layer INS" becomes thinner as a result of the etching process, the insulator layer INS" still covers the conductive residual material RM to isolate the conductive residual material RM from the bridge BG.

Figure 26A:
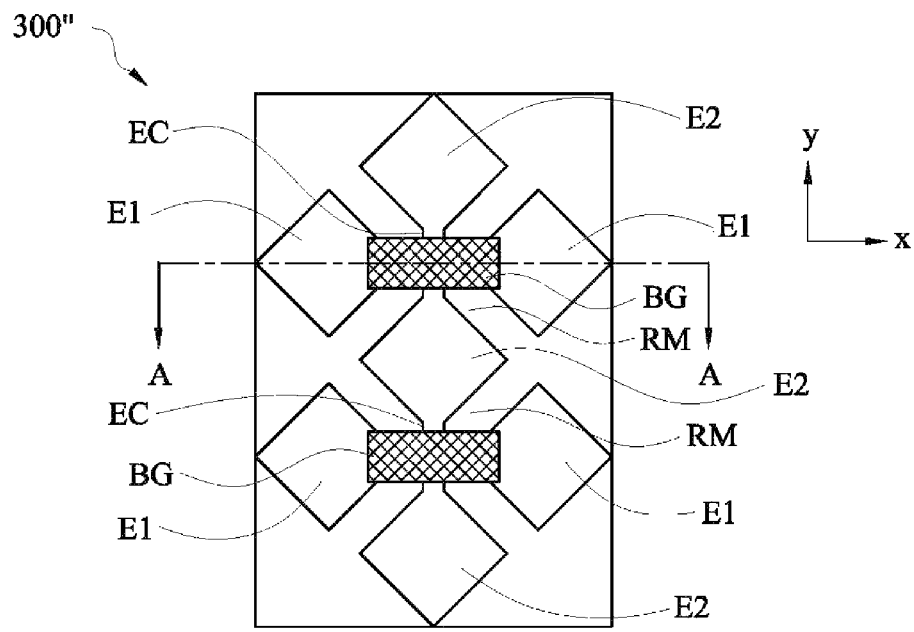
Figure 26B:
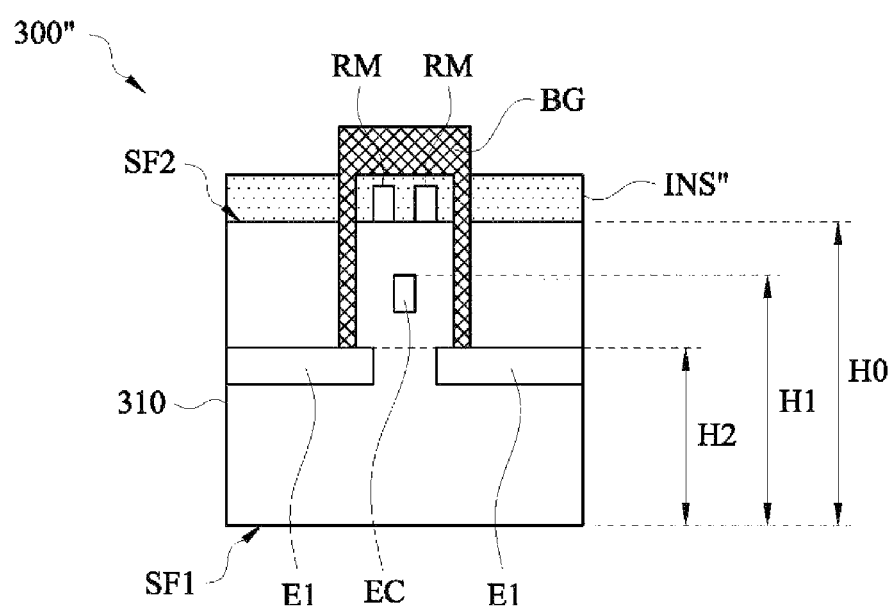

Particular reference is made to FIG. 26A and FIG. 26B. In a sixth step, a bridge BG is provided. The bridge BG crosses the electrode channel EC and is configured to electrically connect two adjacent first touch electrodes E1 to each other.

In this alternative embodiment, since it is not necessary to use a mask MSK in an etching process, the time and costs associated with manufacturing the touch module 300" can be decreased.

Fourth Embodiment

In the paragraphs below, a manufacturing method of a touch module 400 is described. The manufacturing method of the touch module 400 is substantially identical to the manufacturing method of the touch module 100 described above. Thus, many aspects that are similar will not be repeated in the description below.

FIGS. 27A-32A illustrate a manufacturing method of a touch module 400 according to one or more embodiments of the present disclosure. FIGS. 27B-32B are sectional views of the touch module 400 along lines A-A in FIGS. 27A-32A according to one or more embodiments of the present disclosure.

Figure 27A:
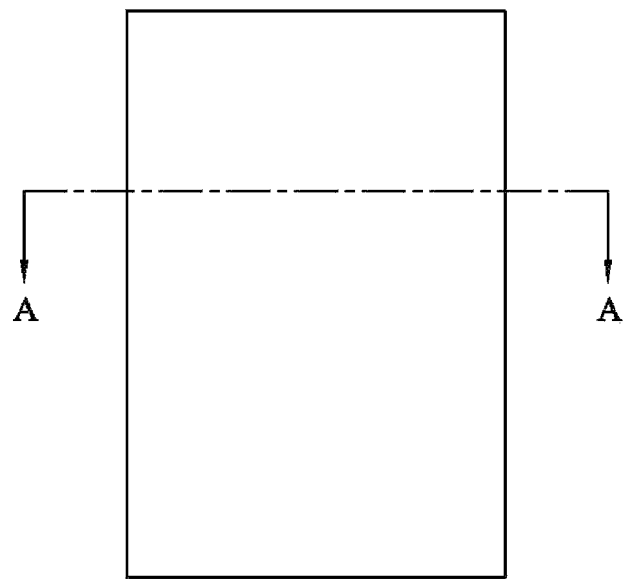
Figure 27B:
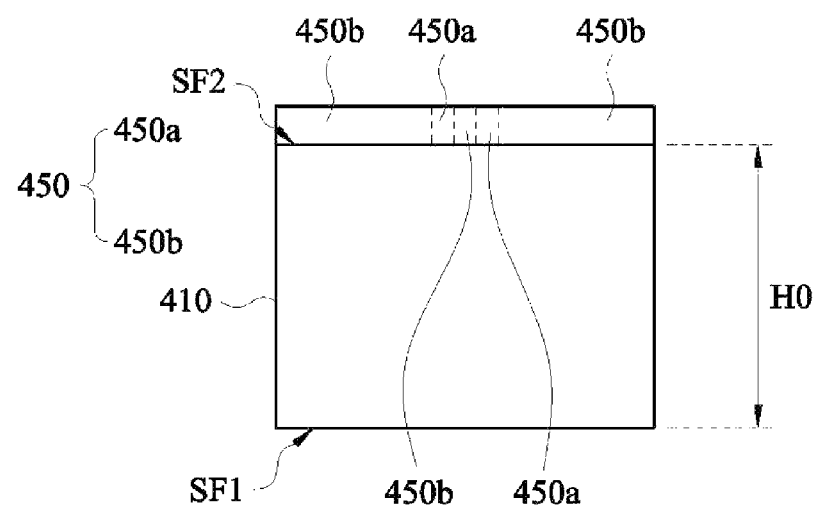

Particular reference is made to FIG. 27A and FIG. 27B. In a first step, a fundamental conductive material layer 450 is provided on the second surface SF2 of the substrate 410. The fundamental conductive material layer 350 includes a fundamental retention portion 450a and a fundamental embedding portion 450b.

Figure 28A:
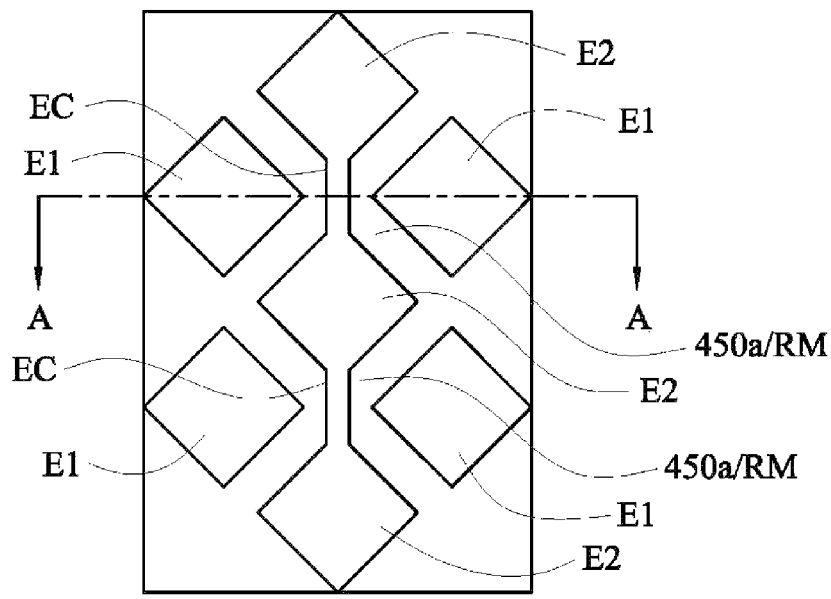
Figure 28B:
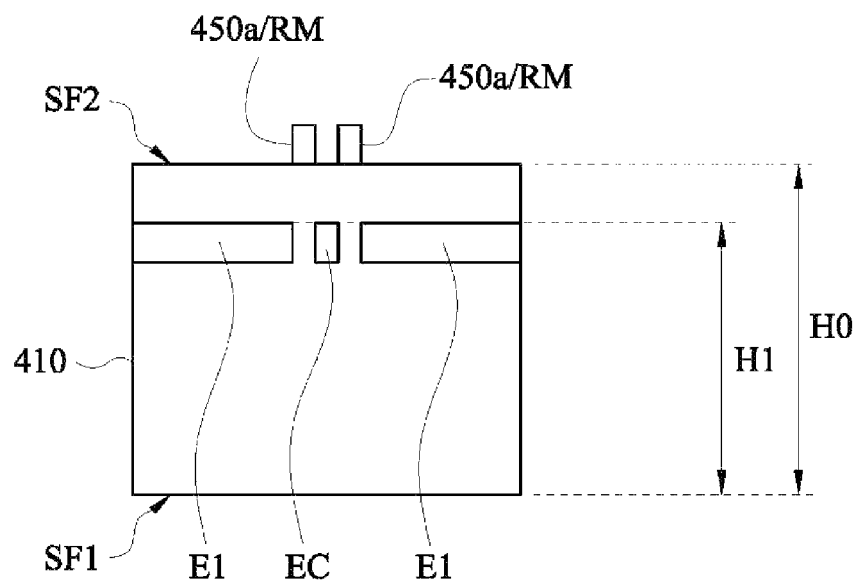

Particular reference is made to FIG. 28A and FIG. 28B. In a second step, the fundamental embedding portion 450b of the fundamental conductive material layer 450 is embedded into the substrate 410 to a height H1 relative to the first surface SF1 of the substrate 410, so as to form the first touch electrodes E1, the second touch electrodes E2, and the electrode channel EC, and the fundamental retention portion 450a of the fundamental conductive material layer 450 is retained on the second surface SF2 of the substrate 410 to form a conductive residual material RM. In one or more embodiments, a difference between the height H1 and the thickness H0 of the substrate 410 is greater than 50 nanometers, such that the fundamental retention portion 450a retained on the second surface SF2 of the substrate 410 is insulated from the first touch electrodes E1, the second touch electrodes E2, and the electrode channel EC with the height H1.

In this embodiment, the fundamental embedding portion 450b of the fundamental conductive material layer 450 is embedded into the substrate 410 to the height H1 relative to the first surface SF1 of the substrate 410 by providing an embedding ink without conductive additive on the fundamental embedding portion 450b of the fundamental conductive material layer 450.

Figure 29A:
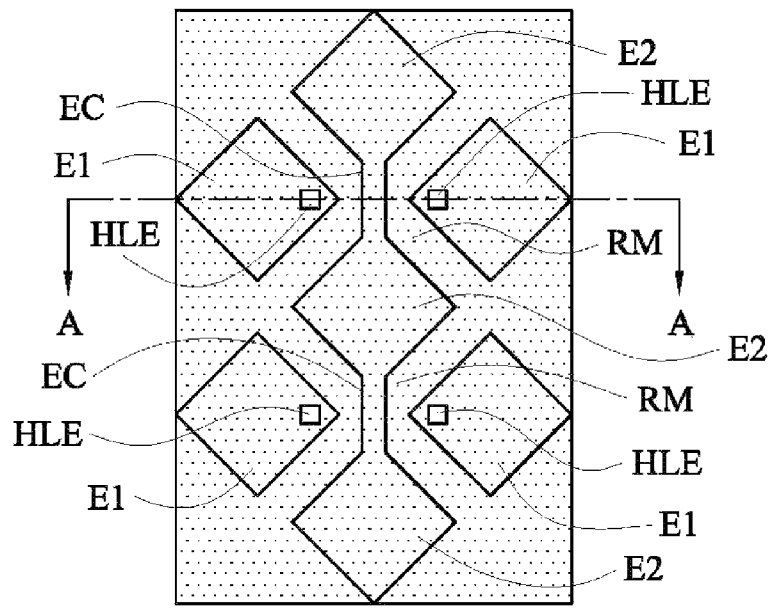
Figure 29B:
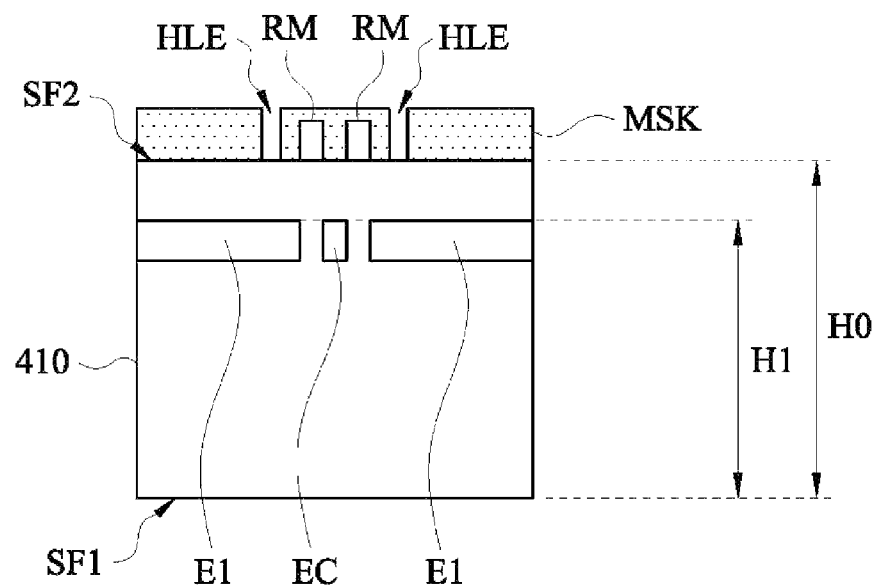

Particular reference is made to FIG. 29A and FIG. 29B. In a third step, a mask MSK is provided on the first surface SF1 or the second surface SF2 of the substrate 410 (in this embodiment, the second surface SF2 is used as an example), and at least two opening portions HLE of the substrate 410 are exposed.

Figure 30A:
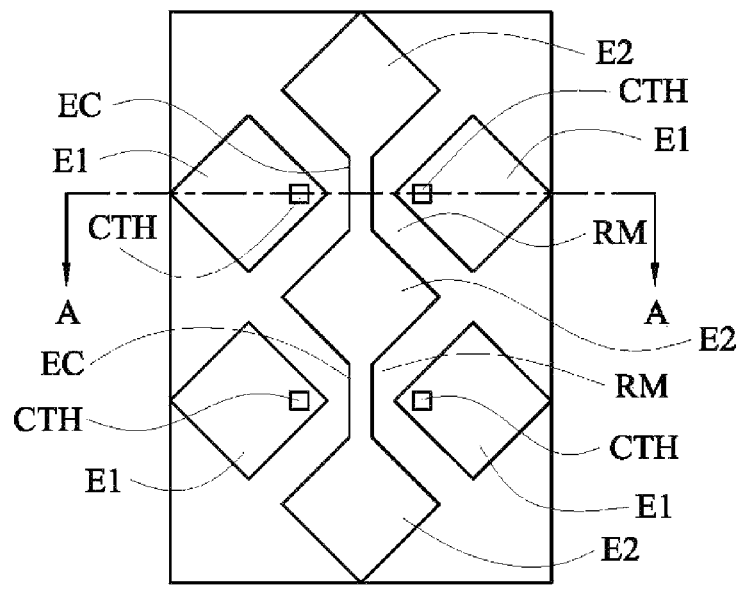
Figure 30B:
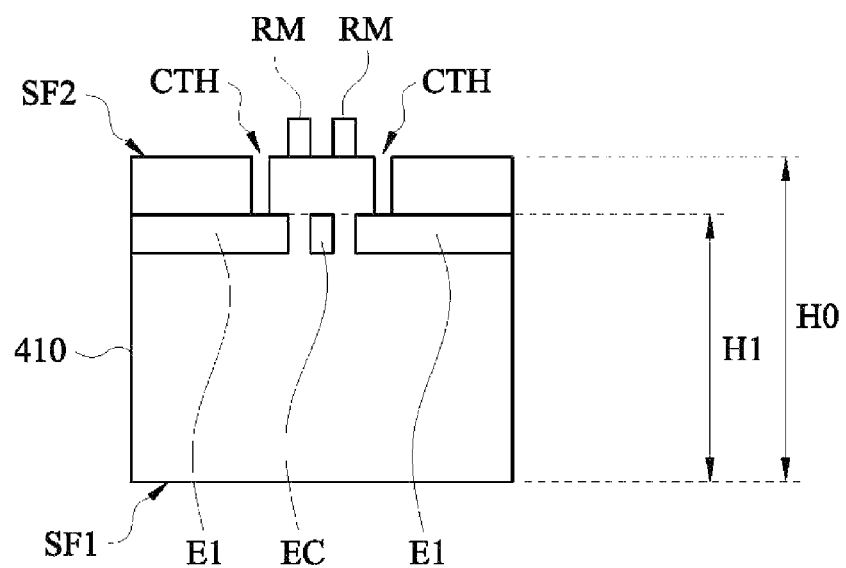

Particular reference is made to FIG. 30A and FIG. 30B. In a fourth step, the opening portions HLE of the substrate 410 are removed to form at least two contact holes CTH. The contact holes CTH are separately disposed on the first touch electrodes E1, and are configured to expose portions of the first touch electrodes E1 embedded in the substrate 410. In this embodiment, the mask MSK on the substrate 410 can be simultaneously removed in the process of removing the opening portions HLE of the substrate 410.

Figure 31A:
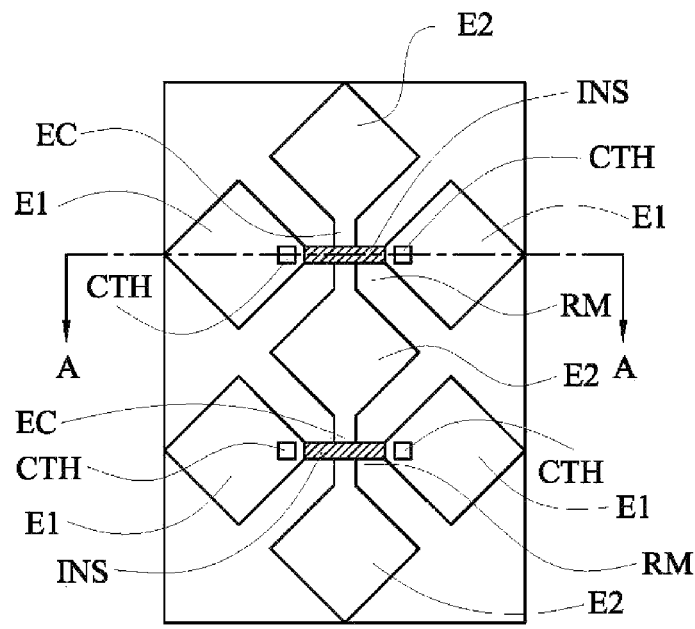
Figure 31B:
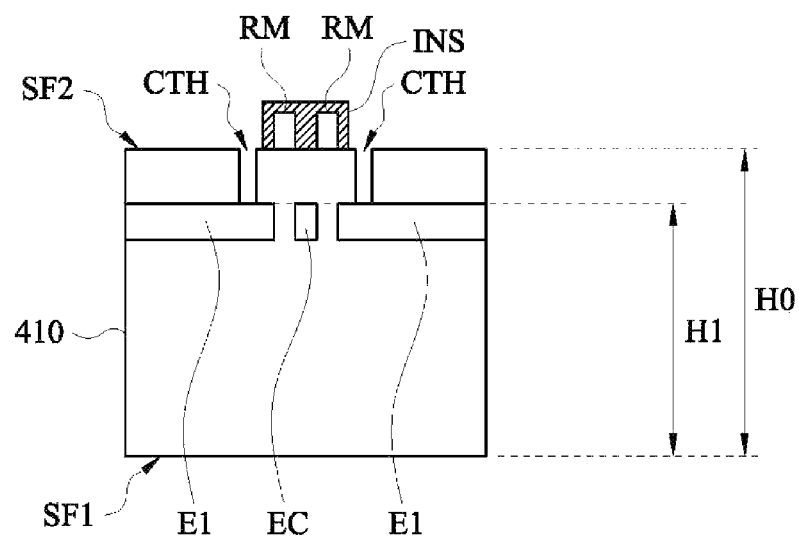

Particular reference is made to FIG. 31A and FIG. 31B. In a fifth step, an insulator layer INS is provided on the conductive residual material RM and covers the conductive residual material RM. The insulator layer INS is configured to isolate the conductive residual material RM from a bridge BG.

Figure 32A:
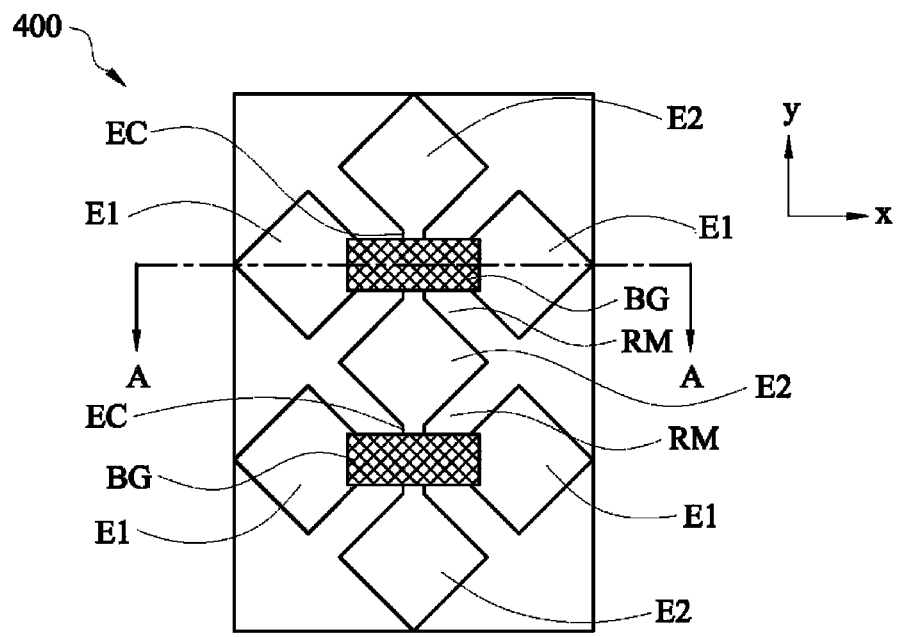
Figure 32B:
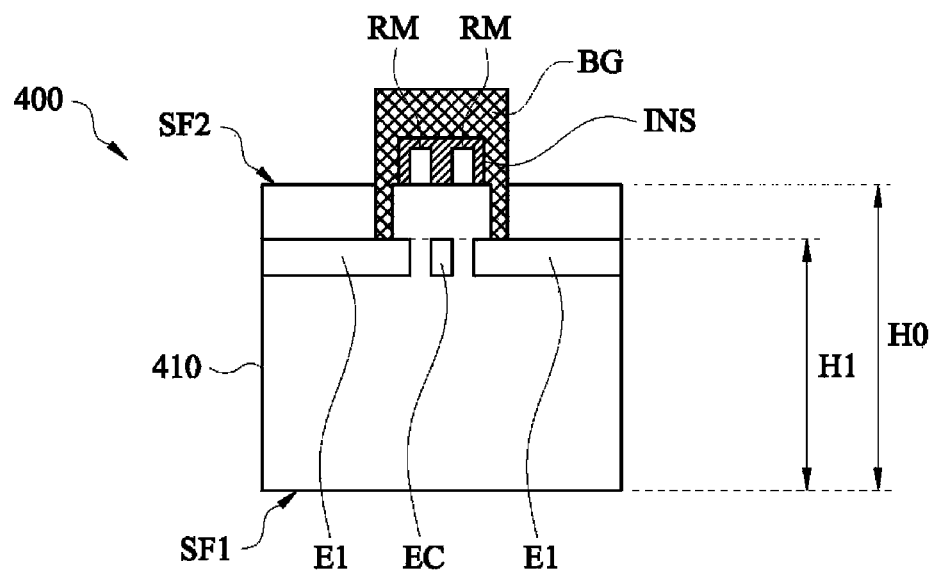

Particular reference is made to FIG. 32A and FIG. 32B. In a seventh step, at least one bridge BG is provided. The bridge BG crosses the electrode channel EC and is configured to electrically connect two adjacent first touch electrodes E1 to each other. In one or more embodiments, the bridge BG electrically connects two adjacent first touch electrodes E1 via the contact holes CHT.

Through the operations mentioned above, the touch module 400 can be realized. By patterning the first and second touch electrodes E1, E2 and the electrode channel EC with such an embedding process and instead of using an etching process, the problem of adversely affecting the optical consistency in the appearance of the touch module 400 caused by uneven refractive indexes of the touch module 400 can be avoided.

Similarly, in this embodiment, substantially no gap or overlap is present among the orthogonal projections of the first touch electrodes E1, the second touch electrodes E2, the electrode channel EC, and the conductive residual material RM onto the first surface SF1 of the substrate 410. As a result, the problem of adversely affecting the optical consistency in the appearance of the touch module 400 caused by uneven refractive indexes of the touch module 400 can be avoided.

In this embodiment, the heights of the first touch electrodes E1, the second touch electrodes E2, and the electrode channel EC relative to the surface SF1 of the substrate 410 are identical to each other and are sufficiently different from the height of the conductive residual material RM relative to the surface SF1 of the substrate 410, so that the first touch electrodes E1, the second touch electrodes E2, and the electrode channel EC are insulated from each other.

In this embodiment, by omitting the step of further embedding the first touch electrodes E1 or the second touch electrodes E2 into the substrate 410, the manufacturing process of the touch module 400 can be simpler than the manufacturing process of the touch module 300.

In addition, in this embodiment, all of the first touch electrodes E1, the second touch electrodes E2, and the electrode channel EC are completely embedded into the substrate 410. That is, all of the first touch electrodes E1, the second touch electrodes E2, and the electrode channel EC are not exposed on the surface SF1 or SF2 of the substrate 410. As a result, it is not necessary for the touch module 400 to have an additional passive layer thereon to protect or isolate the first touch electrodes E1, the second touch electrodes E2, and/or the electrode channel EC, as would be necessary were these elements exposed on the surfaces SF1, SF2 of the substrate 410, such that the time and costs associated with manufacturing the touch module 400 can be decreased.

It should be noted that, in this embodiment, the substrate 410 may include a base layer and an active layer as illustrated in FIG. 8A and FIG. 8B, but is not limited to such an embodiment.

Reference is made to FIGS. 33A-34A and FIGS. 33B-34B. In an alternative embodiment of the present disclosure, a single insulator layer INS' is provided to isolate a plurality of bridges from the conductive residual material RM, such that the manufacturing process of the touch module 400' can be simplified.

Figure 33A:
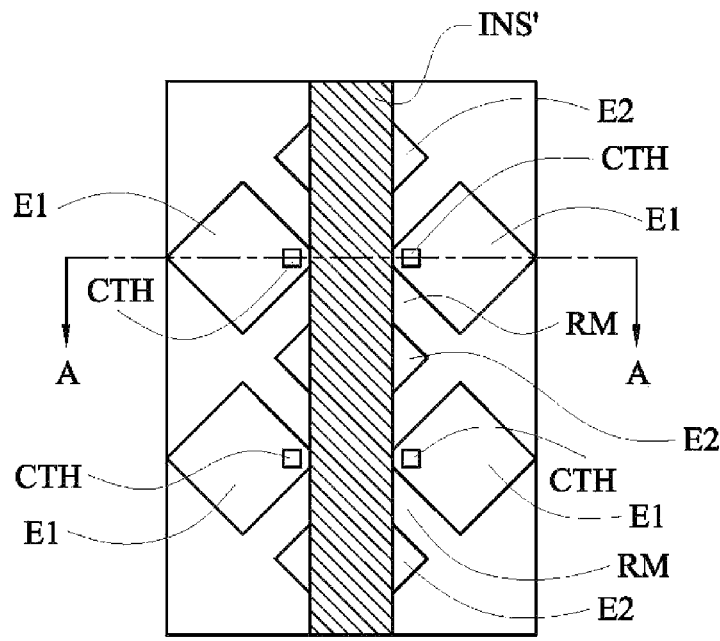
Figure 33B:
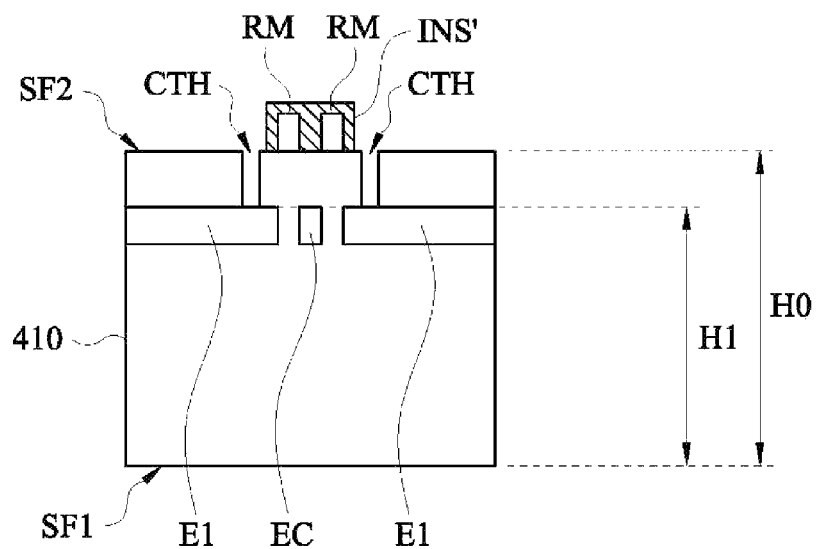

Particular reference is made to FIG. 33A and FIG. 33B. In the fifth step mentioned above, an insulator layer INS' extended along the y-axis is provided and covers a portion of the conductive residual material RM lined in a column.

Figure 34A:
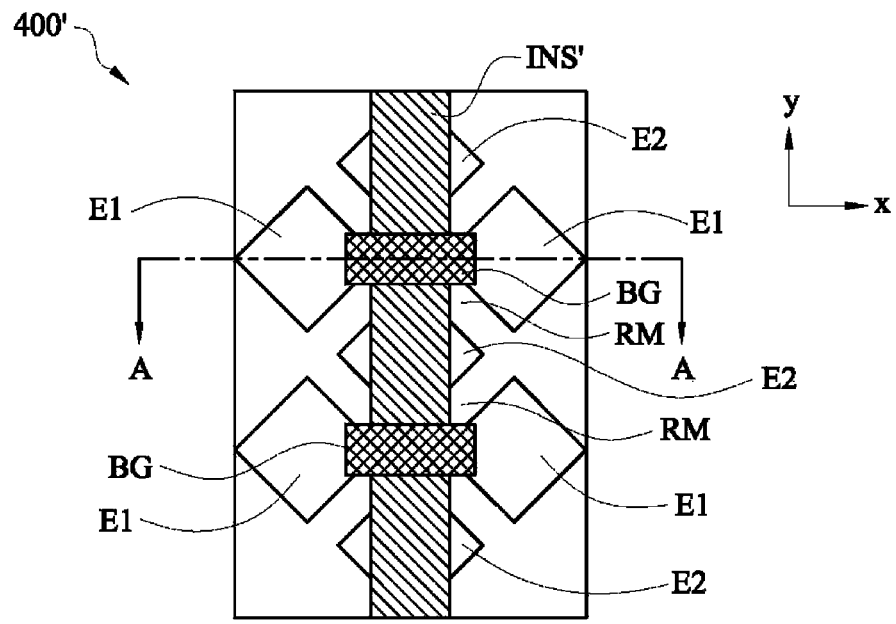
Figure 34B:
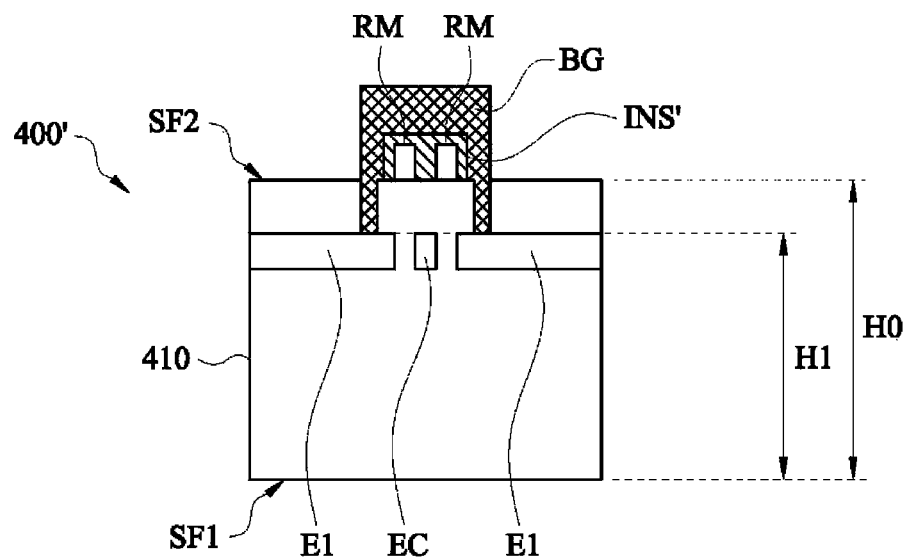

Particular reference is made to FIG. 34A and FIG. 34B. In the sixth step mentioned above, at least two bridges BG crossing the insulator layer INS' are provided. The bridges BG cross different electrode channels EC. Each of the bridges BG is configured to electrically connect two adjacent first touch electrodes E1 via the contact holes CHT, so as to connect two adjacent first touch electrodes E1 to each other.

In this embodiment, the insulator layer INS' can be used to isolate the conductive residual material RM from at least two bridges BG, instead of being used to isolate the conductive residual material RM from simply one bridge BG as described in the embodiment described above. Thus, through the operations described above, the manufacturing process of the touch module 400' can be simplified.

Reference is made to FIGS. 35A-37A and FIGS. 35B-37B. In another alternative embodiment of the present disclosure, an insulator layer INS" is used to replace the mask MSK in the third step described above, so as to simplify the manufacturing process of the touch module 400".

Figure 35A:
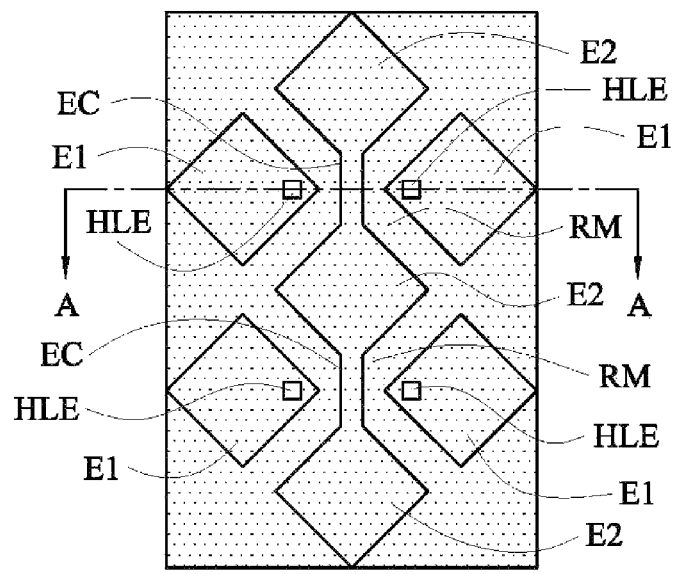
Figure 35B:
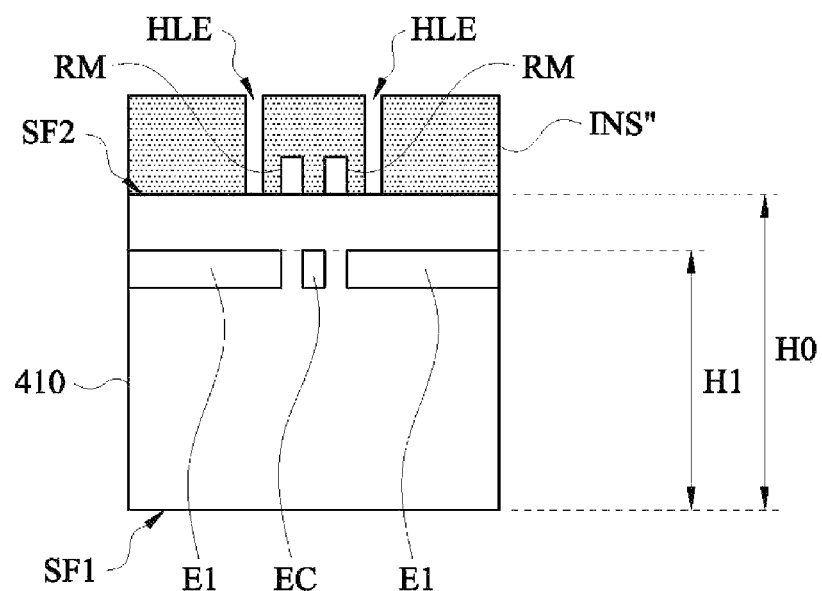

Particular reference is made to FIG. 35A and FIG. 35B. In the third step described above, a thicker insulator layer INS" (e.g., thicker than the insulator layer INS) is provided on the substrate 410 to cover the substrate 410 and expose two opening portions HLE of the substrate 410.

Figure 36A:
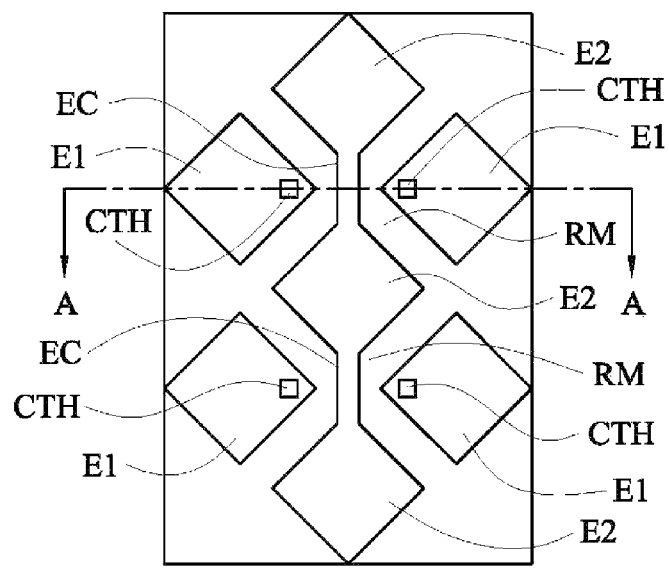
Figure 36B:
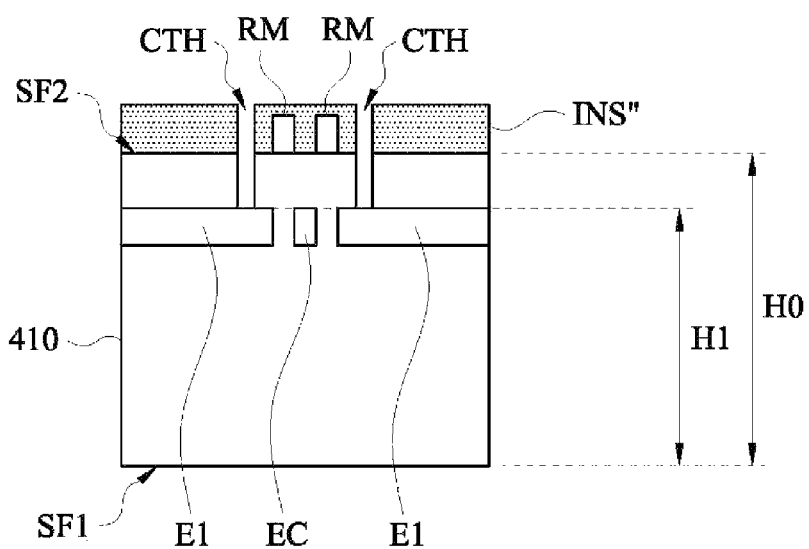

Particular reference is made to FIG. 36A and FIG. 36B. In a fourth step, a part of the insulator layer INS" is etched off, and the opening portions HLE of the substrate 410 are removed to form at least two contact holes CTH. The contact holes CTH are separately disposed on the first touch electrodes E1, and are configured to expose portions of the first touch electrodes E1 embedded in the substrate 410. It should be noted that, in this step, although the insulator layer INS" becomes thinner as a result of the etching process, the insulator layer INS" still covers the conductive residual material RM to isolate the conductive residual material RM from the bridge BG.

Figure 37A:
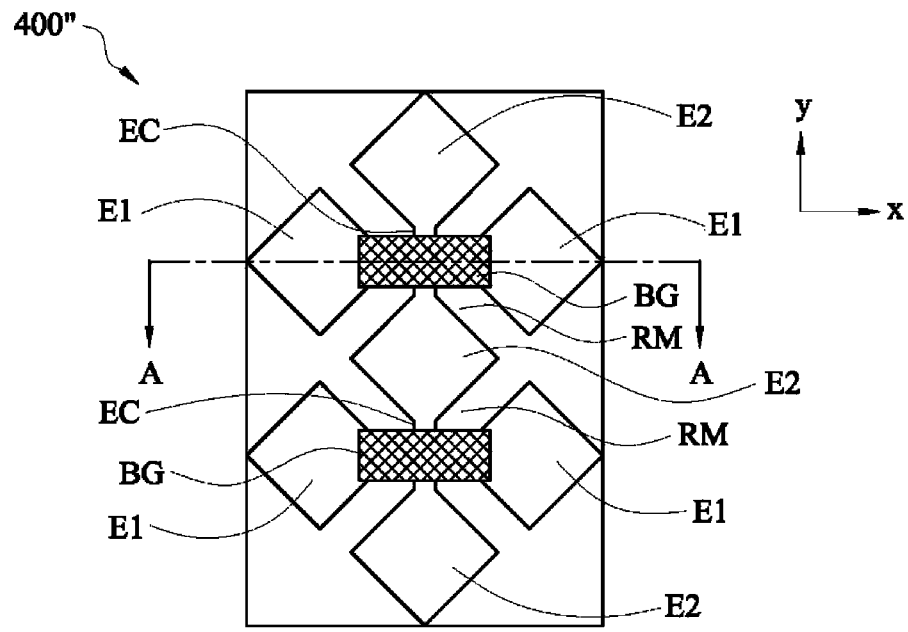
Figure 37B:
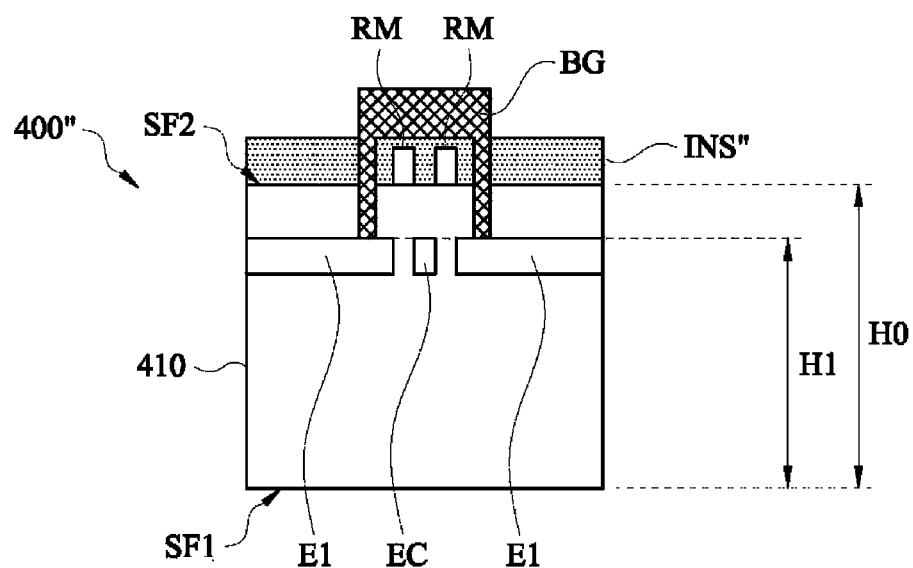

Particular reference is made to FIG. 37A and FIG. 37B. In a fifth step, a bridge BG is provided. The bridge BG crosses the electrode channel EC and is configured to electrically connect two adjacent first touch electrodes E1 to each other.

In this alternative embodiment, since it is not necessary to use a mask MSK in an etching process, the time and costs associated with manufacturing the touch module 400" can be decreased.

Figure 38:
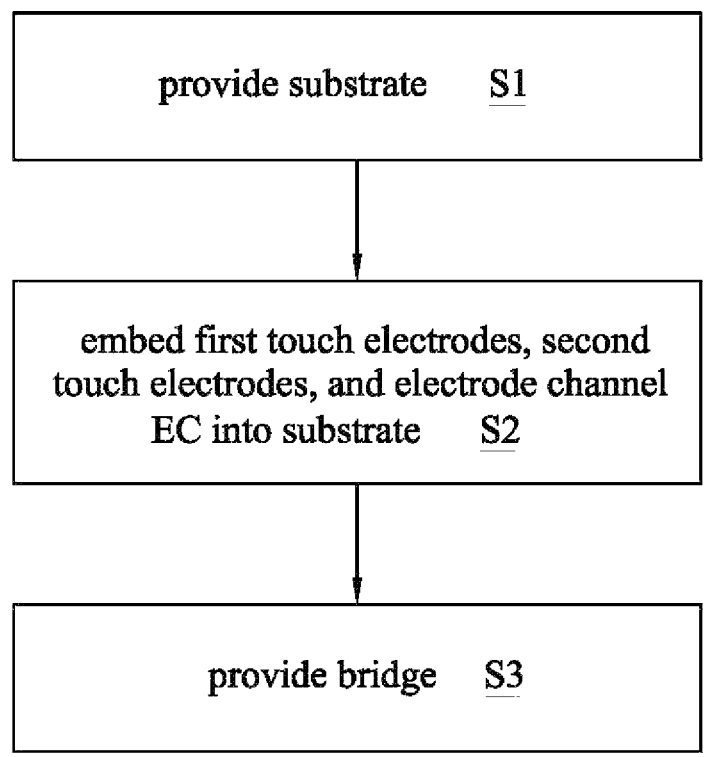
FIG. 38 is a flow chart of a manufacturing method of a touch module according to one or more embodiments of the present disclosure.

FIG. 38 is a flow chart of a manufacturing method 500 of a touch module according to one or more embodiments of the present disclosure. The manufacturing method 500 can be utilized to manufacture the touch modules 100, 200, 300, 300', 300", 400, 400', 400" in the first to sixth embodiments described above, but is not limited in this regard. In the paragraphs below, the touch module 100 in the first embodiment is taken as an example to describe the manufacturing method 500, but the present disclosure is not limited in this regard. The manufacturing method 500 includes the steps outlined below.

In step S1, a substrate 110 is provided.

In step S2, at least two first touch electrodes E1, at least two second touch electrodes E2, and at least one electrode channel EC are embedded into the substrate 110. The electrode channel EC is configured to electrically connect the second touch electrodes E2 to each other.

In step S3, at least one bridge BG is provided. The bridge BG is configured to electrically connect two adjacent first touch electrodes E1 to each other. The first touch electrodes E1 are electrically insulated from the second touch electrodes E2.

Through utilizing the manufacturing method 500 described above, the touch module 100 can be realized. By patterning the first and second touch electrodes E1, E2 and the electrode channel EC with such an embedding process and instead of using an etching process, the problem of adversely affecting the optical consistency in the appearance of the touch module 100 caused by uneven refractive indexes of the touch module 100 can be avoided.

In view of the above, one embodiment of the present disclosure is related to a touch module. The touch module includes a substrate, at least two first touch electrodes, at least two second touch electrodes, at least one electrode channel, and at least one bridge. All of the first touch electrodes, the second touch electrodes, and the electrode channel are embedded in the substrate. The electrode channel is configured to electrically connect the second touch electrodes to each other. The bridge is configured to electrically connect the first touch electrodes to each other. The first touch electrodes are electrically insulated from the second touch electrodes.

Some other embodiments of the present disclosure is related to a manufacturing method of the touch module. The manufacturing method includes providing a substrate; embedding at least two first touch electrodes, at least two second touch electrodes, and at least one electrode channel into the substrate, in which the electrode channel is configured to electrically connect the second touch electrodes to each other; and providing at least one bridge on the first surface of the substrate, so as to electrically connect the first touch electrodes to each other. The first touch electrodes are electrically insulated from the second touch electrodes.

Through an application of one or more embodiments described above, patterning the touch electrodes by an etching process can be avoided, such that the problem of adversely affecting the optical consistency in the appearance of the touch module caused by uneven refractive indexes of the touch module can be avoided.

Although the present disclosure has been described in considerable detail with reference to certain embodiments thereof, other embodiments are possible. Therefore, the scope of the appended claims should not be limited to the description of the embodiments contained herein.

What is claimed is:

1. A touch module comprising:
   a substrate;
   at least two first touch electrodes embedded in the substrate;
   at least two second touch electrodes embedded in the substrate, wherein the first touch electrodes are electrically insulated from the second touch electrodes;
   at least one electrode channel embedded in the substrate, wherein the electrode channel is configured to electrically connect the second touch electrodes to each other;
   at least one bridge crossing over the electrode channel and configured to electrically connect the first touch electrodes to each other; and
   a conductive residual material, wherein:
      an orthogonal projection of the conductive residual material onto a first surface of the substrate is located among orthogonal projections of the first touch electrodes, the second touch electrodes, and the electrode channel onto the first surface of the substrate, and
      a height of the conductive residual material relative to the first surface of the substrate is sufficiently different from heights of the first touch electrodes, the second touch electrodes, and the electrode channel relative to the first surface of the substrate, such that the conductive residual material is insulated from the first touch electrodes, the second touch electrodes, and the electrode channel.

2. The touch module as claimed in claim 1, wherein:
   the substrate comprises a base layer and an active layer, the active layer is disposed on the base layer, and
   the first touch electrodes, the second touch electrodes, and the electrode channel are embedded in the active layer.

3. The touch module as claimed in claim 1, wherein the heights of the first touch electrodes relative to the first surface of the substrate and the heights of the second touch electrodes relative to the first surface of the substrate are different.

4. The touch module as claimed in claim 3, wherein a difference between the heights of the first touch electrodes relative to the first surface of the substrate and the heights of the second touch electrodes relative to the first surface of substrate is greater than 50 nanometers.

5. The touch module as claimed in claim 1, wherein the heights of the first touch electrodes relative to the first surface of the substrate are the same as the heights of the second touch electrodes relative to the first surface of the substrate.

6. The touch module as claimed in claim 1, wherein the orthogonal projections of the conductive residual material, the first touch electrodes, the second touch electrodes, and the electrode channel onto the first surface of substrate are substantially not overlapped with each other.

7. The touch module as claimed in claim 1, further comprising:
   an insulator layer disposed between the conductive residual material and the bridge, wherein the insulator layer is configured to isolate the conductive residual material and the bridge.

8. The touch module as claimed in claim 1, wherein:
   a difference between the height of the conductive residual material relative to the first surface of the substrate and the heights of the first touch electrodes relative to the first surface of the substrate is greater than 50 nanometers, or
   a difference between the height of the conductive residual material relative to the first surface of the substrate and the heights of the second touch electrodes relative to the first surface of the substrate is greater than 50 nanometers.

9. The touch module as claimed in claim 1, wherein a height of the electrode channel relative to the first surface of the substrate is the same as the heights of the second touch electrodes relative to the first surface of the substrate.

10. The touch module as claimed in claim 1, wherein:
the substrate comprises at least two contact holes extending to the first touch electrodes through at least some of the substrate, and
the bridge is electrically connected to the first touch electrodes via the contact holes.

11. The touch module as claimed in claim 1, wherein embedding depths of the first touch electrodes or the second touch electrodes relative to a second surface of the substrate, opposite to the first surface, are substantially between 10 and 500 nanometers.

12. The touch module as claimed in claim 1, wherein:
the first touch electrodes are disposed along a first direction, and
the second touch electrodes are disposed along a second direction different from the first direction.

13. The touch module as claimed in claim 1, wherein each of the first touch electrodes and each of the second touch electrodes substantially has a diamond shape.

14. A manufacturing method of a touch module, the manufacturing method comprising:
providing a substrate;
embedding at least two first touch electrodes, at least two second touch electrodes, and at least one electrode channel into the substrate, wherein:
the electrode channel is configured to electrically connect the second touch electrodes to each other, and
the first touch electrodes are electrically insulated from the second touch electrodes;
forming at least two contact holes in the substrate; and
providing at least one bridge on a first surface of the substrate and in the contact holes, so as to allow the bridge to electrically connect the first touch electrodes to each other via the contact holes.

15. The manufacturing method as claimed in claim 14, wherein:
the providing the substrate comprises:
providing a base layer; and
providing an active layer on the base layer, and
the embedding the at least two first touch electrodes, the at least two second touch electrodes, and the at least one electrode channel into the substrate comprises:
embedding the first touch electrodes, the second touch electrodes, and the electrode channel into the active layer of the substrate.

16. The manufacturing method as claimed in claim 14, wherein:
the embedding the at least two first touch electrodes, the at least two second touch electrodes, and the at least one electrode channel into the substrate comprises:
providing a fundamental conductive material layer on the substrate; and
embedding a fundamental embedding portion of the fundamental conductive material layer into the substrate to a first height relative to a second surface of the substrate opposite to the first surface, so as to form the first touch electrodes, the second touch electrodes, and the electrode channel, and retaining a fundamental retention portion of the fundamental conductive material layer on the first surface of the substrate, so as to form a conductive residual material.

17. The manufacturing method as claimed in claim 16, further comprising:

providing an insulator layer on the conductive residual material before the bridge is provided, so as to isolate the bridge and the conductive residual material.

18. The manufacturing method as claimed in claim 16, wherein the embedding the fundamental embedding portion of the fundamental conductive material layer into the substrate comprises:
providing an embedding ink without conductive additive on the substrate corresponding to the fundamental embedding portion of the fundamental conductive material layer, such that the fundamental embedding portion of the fundamental conductive material layer is embedded into the substrate.

19. The manufacturing method as claimed in claim 14, wherein:
the embedding the at least two first touch electrodes, the at least two second touch electrodes, and the at least one electrode channel into the substrate comprises:
providing a fundamental conductive material layer on the substrate;
embedding a fundamental embedding portion of the fundamental conductive material layer into the substrate to a first height relative to a second surface of the substrate opposite to the first surface, so as to form a first conductive material layer, and retaining a fundamental retention portion of the fundamental conductive material layer on the first surface of the substrate, so as to form a conductive residual material; and
further embedding a first embedding portion of the first conductive material layer into the substrate to a second height relative to the second surface of the substrate, so as to form a second conductive material layer, and retaining a first retention portion of the first conductive material layer at the first height relative to the second surface of the substrate, and
either:
the first retention portion comprises the first touch electrodes and the second conductive material layer comprises an assembly of the second touch electrodes and the electrode channel, or
the first retention portion comprises the assembly of the second touch electrodes and the electrode channel, and the second conductive material layer comprises the first touch electrodes.

20. The manufacturing method as claimed in claim 19, further comprising:
providing an insulator layer on the conductive residual material before the bridge is provided, so as to isolate the bridge and the conductive residual material.

21. The manufacturing method as claimed in claim 19, wherein the embedding the fundamental embedding portion of the fundamental conductive material layer into the substrate comprises:
providing an embedding ink without conductive additive on the fundamental embedding portion of the fundamental conductive material layer, such that the fundamental embedding portion of the fundamental conductive material layer is embedded into the substrate.

22. The manufacturing method as claimed in claim 14, wherein:
the embedding the at least two first touch electrodes, the at least two second touch electrodes, and the at least one electrode channel into the substrate comprises:
embedding a first conductive material layer into the substrate to a first height relative to a second surface of the substrate opposite to the first surface;

further embedding a first embedding portion of the first conductive material layer into the substrate to a second height relative to the second surface of the substrate, so as to form a second conductive material layer, and retaining a first retention portion of the first conductive material layer at the first height relative to the second surface of the substrate; and further embedding a second embedding portion of the second conductive material layer into the substrate to a third height relative to the second surface of the substrate, so as to form a third conductive material layer, and retaining a second retention portion of the second conductive material layer at the second height relative to the second surface of the substrate, the first retention portion comprises one of the first touch electrodes, an assembly of the second touch electrodes and the electrode channel, and a conductive residual material, the second retention portion comprises another one of the first touch electrodes, the assembly of the second touch electrodes and the electrode channel, and the conductive residual material, and the third conductive material layer comprises the last one of the first touch electrodes, the assembly of the second touch electrodes and the electrode channel, and the conductive residual material.

23. The manufacturing method as claimed in claim 22, wherein the embedding the first conductive material layer into the substrate comprises:
providing an embedding ink having conductive additive on the substrate to cause the conductive additive to be embedded into the substrate to form the first conductive material layer.

24. The manufacturing method as claimed in claim 22, wherein the embedding the first conductive material layer into the substrate comprises:
providing a fundamental conductive material layer on the substrate; and
providing an embedding ink without conductive additive on the fundamental conductive material layer to cause the fundamental conductive material layer to be embedded into the substrate, to form the first conductive material layer.

25. The manufacturing method as claimed in claim 22, wherein the further embedding the first embedding portion of the first conductive material layer into the substrate comprises:
providing an embedding ink without conductive additive on the substrate corresponding to the first embedding portion of the first conductive material layer, such that the first embedding portion of the first conductive material layer is embedded into the substrate.

26. The manufacturing method as claimed in claim 14, wherein the forming the at least two contact holes in the substrate comprises:
providing a mask on the substrate and exposing at least two opening portions of the substrate; and
removing the opening portions of the substrate to form the contact holes.

27. The manufacturing method as claimed in claim 14, further comprising:
providing an insulator layer covering the substrate and a conductive residual material and exposing at least two opening portions of the substrate before the bridge is provided, wherein:
the insulator layer is used to isolate the bridge and the conductive residual material, and
the forming the at least two contact holes in the substrate comprises etching the opening portions of the substrate to form the contact holes.

28. A manufacturing method of a touch module, the manufacturing method comprising:
providing a substrate;
embedding at least two first touch electrodes, at least two second touch electrodes, and at least one electrode channel into the substrate, wherein:
the electrode channel is configured to electrically connect the second touch electrodes to each other,
the first touch electrodes are electrically insulated from the second touch electrodes, and
the embedding the at least two first touch electrodes, the at least two second touch electrodes, and the at least one electrode channel into the substrate comprises:
providing a fundamental conductive material layer on the substrate; and
embedding a fundamental embedding portion of the fundamental conductive material layer into the substrate to a first height relative to a first surface of the substrate, so as to form the first touch electrodes, the second touch electrodes, and the electrode channel, and retaining a fundamental retention portion of the fundamental conductive material layer on a second surface of the substrate opposite to the first surface, so as to form a conductive residual material; and
providing at least one bridge on the second surface of the substrate, so as to electrically connect the first touch electrodes to each other.

29. A manufacturing method of a touch module, the manufacturing method comprising:
providing a substrate;
embedding at least two first touch electrodes, at least two second touch electrodes, and at least one electrode channel into the substrate, wherein:
the electrode channel is configured to electrically connect the second touch electrodes to each other,
the first touch electrodes are electrically insulated from the second touch electrodes,
the embedding the at least two first touch electrodes, the at least two second touch electrodes, and the at least one electrode channel into the substrate comprises:
embedding a first conductive material layer into the substrate to a first height relative to a first surface of the substrate;
further embedding a first embedding portion of the first conductive material layer into the substrate to a second height relative to the first surface of the substrate, so as to form a second conductive material layer, and retaining a first retention portion of the first conductive material layer at the first height relative to the first surface of the substrate; and
further embedding a second embedding portion of the second conductive material layer into the substrate to a third height relative to the first surface of the substrate, so as to form a third conductive material layer, and retaining a second retention portion of the second conductive material layer at the second height relative to the first surface of the substrate, the first retention portion comprises one of the first touch electrodes, an assembly of the second touch electrodes and the electrode channel, and a conductive residual material, the second retention portion comprises another one of the first touch electrodes, the assembly of the second touch electrodes and the electrode channel, and the conductive residual material, and the third conductive material layer comprises the last one of the first touch electrodes, the assembly of the second touch electrodes and the electrode channel, and the conductive residual material; and providing at least one bridge on a second surface of the substrate opposite to the first surface, so as to electrically connect the first touch electrodes to each other.

30. The manufacturing method as claimed in claim 29, wherein the embedding the first conductive material layer into the substrate comprises:

providing an embedding ink having conductive additive on the substrate to cause the conductive additive to be embedded into the substrate to form the first conductive material layer.

31. The manufacturing method as claimed in claim 29, wherein the embedding the first conductive material layer into the substrate comprises:

providing a fundamental conductive material layer on the substrate; and providing an embedding ink without conductive additive on the fundamental conductive material layer to cause the fundamental conductive material layer to be embedded into the substrate, to form the first conductive material layer.

32. A manufacturing method of a touch module, the manufacturing method comprising:

providing a substrate;

embedding at least two first touch electrodes, at least two second touch electrodes, and at least one electrode channel into the substrate, wherein:

the electrode channel is configured to electrically connect the second touch electrodes to each other, the first touch electrodes are electrically insulated from the second touch electrodes, the embedding the at least two first touch electrodes, the at least two second touch electrodes, and the at least one electrode channel into the substrate comprises:

providing a fundamental conductive material layer on the substrate;

embedding a fundamental embedding portion of the fundamental conductive material layer into the substrate to a first height relative to a first surface of the substrate, so as to form a first conductive material layer, and retaining a fundamental retention portion of the fundamental conductive material layer on a second surface of the substrate opposite to the first surface, so as to form a conductive residual material; and further embedding a first embedding portion of the first conductive material layer into the substrate to a second height relative to the first surface of the substrate, so as to form a second conductive material layer, and retaining a first retention portion of the first conductive material layer at the first height relative to the first surface of the substrate, and either:

the first retention portion comprises the first touch electrodes and the second conductive material layer comprises an assembly of the second touch electrodes and the electrode channel, or the first retention portion comprises the assembly of the second touch electrodes and the electrode channel, and the second conductive material layer comprises the first touch electrodes; and providing at least one bridge on the second surface of the substrate, so as to electrically connect the first touch electrodes to each other.

* * * * *